US007710825B2

(12) United States Patent  
Betts et al.

(10) Patent No.: US 7,710,825 B2
(45) Date of Patent: May 4, 2010

(54) SIDE SCAN SONAR IMAGING SYSTEM WITH BOAT POSITION ON DISPLAY

(75) Inventors: David A. Betts, Eufaula, AL (US); Robert W. Derrow, Eufaula, AL (US); David J. Howells, Atlanta, GA (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 12/319,594

(22) Filed: Jan. 9, 2009

(65) Prior Publication Data

US 2009/0122647 A1   May 14, 2009

Related U.S. Application Data

(63) Continuation of application No. 11/195,107, filed on Aug. 2, 2005, now Pat. No. 7,652,952.

(60) Provisional application No. 60/598,326, filed on Aug. 2, 2004.

(51) Int. Cl.  
  *G01S 15/89* (2006.01)  
  *G01S 7/52* (2006.01)
(52) U.S. Cl. .................. 367/107; 367/88; 367/111
(58) Field of Classification Search .......... 367/88, 367/107, 111  
See application file for complete search history.

(56) References Cited

U.S. PATENT DOCUMENTS

| 1,823,329 | A | 9/1931 | Marrison |
| 2,416,338 | A | 2/1947 | Mason |
| 3,005,973 | A | 10/1961 | Kietz |
| 3,090,030 | A | 5/1963 | Schuck |
| 3,142,032 | A | 7/1964 | Jones |
| 3,144,631 | A | 8/1964 | Lustig et al. |
| 3,296,579 | A | 1/1967 | Farr et al. |
| 3,359,537 | A | 12/1967 | Geil et al. |
| 3,381,264 | A | 4/1968 | Lavergne et al. |

(Continued)

FOREIGN PATENT DOCUMENTS

GB        1316138        5/1973

OTHER PUBLICATIONS

USACE, "Chapter 11, Acoustic Multibeam Survey Systems for Deep-Draft Navigation Projects", Apr. 1, 2004, 44 pages.

(Continued)

*Primary Examiner*—Ian J Lobo  
(74) *Attorney, Agent, or Firm*—Kinney & Lange, P.A.

(57) ABSTRACT

A system for use with a boat to provide underwater sonar images includes a left side scan sonar transducer for transmitting left side scan sonar pulses and for receiving left side scan sonar return signals and a right side scan sonar transducer for transmitting right side scan sonar pulses and for receiving right side scan sonar return signals. The system further includes signal processing circuitry for processing the left and right side scan sonar return signals to produce side scan image data and a digital processor for providing signals to a display based upon the side scan image data to produce a display image on the display showing boat location, a water column between the boat and bottom, and an underwater image comprising at least one of a left side underwater image and a right side underwater image.

18 Claims, 16 Drawing Sheets

U.S. PATENT DOCUMENTS

| | | |
|---|---|---|
| 3,451,038 A | 6/1969 | Maass |
| 3,458,854 A | 7/1969 | Murphree |
| 3,484,737 A | 12/1969 | Walsh |
| 3,553,638 A | 1/1971 | Sublett |
| 3,585,578 A | 6/1971 | Fischer, Jr. |
| 3,585,579 A | 6/1971 | Dorr et al. |
| 3,624,596 A | 11/1971 | Dickenson et al. |
| 3,716,824 A | 2/1973 | Dorr et al. |
| 3,742,436 A | 6/1973 | Jones |
| 3,757,287 A | 9/1973 | Bealor, Jr. |
| 3,895,339 A | 7/1975 | Jones et al. |
| 3,895,340 A | 7/1975 | Gilmour |
| 3,898,608 A | 8/1975 | Jones et al. |
| 3,949,348 A | 4/1976 | Dorr |
| 3,950,723 A | 4/1976 | Gilmour |
| 3,953,828 A | 4/1976 | Cook |
| 3,964,424 A | 6/1976 | Hagemann |
| 3,967,234 A | 6/1976 | Jones |
| 4,030,096 A | 6/1977 | Stevens et al. |
| 4,047,148 A | 9/1977 | Hagemann |
| 4,052,693 A | 10/1977 | Gilmour |
| 4,063,212 A | 12/1977 | Sublett |
| 4,075,599 A | 2/1978 | Kosalos et al. |
| 4,184,210 A | 1/1980 | Hagemann |
| 4,197,591 A | 4/1980 | Hagemann |
| 4,198,702 A | 4/1980 | Clifford |
| 4,199,746 A | 4/1980 | Jones et al. |
| 4,200,922 A | 4/1980 | Hagemann |
| 4,204,281 A | 5/1980 | Hagemann |
| 4,207,620 A | 6/1980 | Morgera |
| 4,216,537 A | 8/1980 | Delignieres |
| 4,232,380 A | 11/1980 | Caron et al. |
| 4,247,923 A | 1/1981 | De Kok |
| 4,262,344 A | 4/1981 | Gilmour |
| 4,287,578 A | 9/1981 | Heyser |
| 4,422,166 A | 12/1983 | Klein |
| 4,493,064 A | 1/1985 | Odero et al. |
| 4,635,240 A | 1/1987 | Geohegan, Jr. et al. |
| 4,641,290 A | 2/1987 | Massa et al. |
| 4,642,801 A | 2/1987 | Perny |
| 4,796,238 A | 1/1989 | Bourgeois et al. |
| 4,802,148 A | 1/1989 | Gilmour |
| 4,815,045 A | 3/1989 | Nakamura |
| 4,855,961 A | 8/1989 | Jaffe et al. |
| 4,879,697 A | 11/1989 | Lowrance et al. |
| 4,912,685 A | 3/1990 | Gilmour |
| 4,924,448 A | 5/1990 | Gaer |
| 4,958,330 A | 9/1990 | Higgins |
| 4,970,700 A | 11/1990 | Gilmour et al. |
| 4,975,887 A | 12/1990 | Maccabee et al. |
| 4,982,924 A | 1/1991 | Havins |
| 5,033,029 A | 7/1991 | Jones |
| 5,113,377 A | 5/1992 | Johnson |
| 5,142,502 A | 8/1992 | Wilcox et al. |
| 5,155,706 A | 10/1992 | Haley et al. |
| 5,182,732 A | 1/1993 | Pichowkin |
| 5,184,330 A | 2/1993 | Adams et al. |
| 5,241,314 A | 8/1993 | Keeler et al. |
| 5,243,567 A | 9/1993 | Gingerich |
| 5,257,241 A | 10/1993 | Henderson et al. |
| 5,260,912 A | 11/1993 | Latham |
| 5,303,208 A | 4/1994 | Dorr |
| 5,376,933 A | 12/1994 | Tupper et al. |
| 5,390,152 A | 2/1995 | Boucher et al. |
| 5,412,618 A | 5/1995 | Gilmour |
| 5,442,358 A | 8/1995 | Keeler et al. |
| 5,493,619 A | 2/1996 | Haley et al. |
| 5,515,337 A | 5/1996 | Gilmour et al. |
| 5,537,366 A | 7/1996 | Gilmour |
| 5,546,356 A | 8/1996 | Zehner |
| 5,596,549 A | 1/1997 | Sheriff |
| 5,602,801 A | 2/1997 | Nussbaum et al. |
| 5,930,199 A | 7/1999 | Wilk |
| 6,002,644 A | 12/1999 | Wilk |
| 6,215,730 B1 | 4/2001 | Pinto |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,842,401 B2 | 1/2005 | Chiang et al. |
| 6,980,688 B2 | 12/2005 | Wilk |
| 7,236,427 B1 | 6/2007 | Schroeder |
| 7,355,924 B2 * | 4/2008 | Zimmerman et al. .......... 367/88 |
| 7,405,999 B2 | 7/2008 | Skjold-Larsen |

OTHER PUBLICATIONS

Various Imagenex Technical Specifcations and User's Manual, prior to Aug. 2003, 36 pages.

Andrew and Young, "Setup and Troubleshooting Procedures for Klein 5500 SideScan Sonar", Nov. 2003, 160 pages.

Kongsberg Maritime AS, "EA 400 Survey", Aug. 2004, 4 pages.

U.S. Appl. No. 60/552,769 File Wrapper, Mar. 12, 2004.

Edo Corporation Global Technology Reach, Model 6400 Fan Beam Transducer, http://web/archive/org/web/20040608054923/www.edoceramic.con/NavDucers.htm, Jun. 3, 2004, pp. 1-4.

Klein Digital Sonar Systems, ". . . The Next Generation From the World Leader in Side Scan Sonar and Sub-bottom Profiling Systems" 1988, pp. 3-12.

Humminbird "The Product Line>Matrix Products>Matrix 35" http://web.archive.org/web/20030404000447/www.humminbird.com/hb_Products.asp?ID, Apr. 4, 2003, pp. 1-2.

Humminbird "Matrix 97 GPS Trackplotter Operations Manual" 2003 pp. 1-82.

Humminbird "Matrix 35 Fishing System", prior to Aug. 2, 2003, 4 pages.

Hydro International "Product Survey Side-Scan Sonar" Apr. 2004, pp. 36-39.

"Transducers Quad Beam", prior to Aug. 2, 2003, 1 page.

Techsonic Industries Inc. "Mask, Acoustic" Schematic, May 24, 1996, 1 page.

Techsonic Industries Inc. "Element, 455kHz" Schematic, Jun. 13, 1996, 1 page.

D.M. Hussong, D.M. Hills, J.F. Campbell, and D.S. Peat, "High-Resolution Acoustic Seafloor Mapping", 20th Annual OTC, Houston, Texas, May 2-5, 1988, pp. 305-310.

Nancy Baker, Patricia Fryer, and Fernando Martinez "Rifting history of the northern Mariana Trough: SeaMARC II and seismic reflection surveys", Journal of Geophysical Research, vol. 101, No. B5, May 10, 1996, pp. 11,427-11,455.

Patience A. Cowie, Alberto Malinverno, William B.F. Ryan, and Margo H. Edwards, "Quantitative fault studies on the East Pacific Rise: A comparison of sonar imaging techniques" Journal of Geophysical Research, vol. 99, No. B8, Aug. 10, 1994, pp. 15,205-15,218.

Techsonic Industries, Inc. "Wideside", prior to Aug. 2, 2003, 5 pages.

* cited by examiner

SIDE SCAN SONAR IMAGING SYSTEM WITH BOAT POSITION ON DISPLAY

CROSS-REFERENCE TO RELATED APPLICATION(S)

This is a continuation of U.S. patent application Ser. No. 11/195,107, entitled "SONAR IMAGING SYSTEM FOR MOUNTING TO WATERCRAFT," filed Aug. 2, 2005 by David A. Betts et al. and claims the benefit of U.S. Provisional Patent Application No. 60/598,326, filed Aug. 2, 2004, the teachings and disclosure of which are hereby incorporated in their entireties by reference thereto.

Reference is also made to application Ser. No. 12/319,604 entitled "SIDE SCAN SONAR IMAGING SYSTEM WITH ASSOCIATED GPS DATA" and application Ser. No. 12/319,586 entitled "SIDE SCAN SONAR IMAGING SYSTEM WITH IMAGE ENHANCEMENT", which are filed on even date and are assigned to the same assignee as this application.

FIELD OF THE INVENTION

The present invention relates generally to sonar imaging systems for use in sport fishing applications such as in a fish finder, sonar depth sounder, etc., and more particularly to side scan sonar imaging systems for imaging of the underwater environment to the sides of the watercraft rather than just below the watercraft.

BACKGROUND OF THE INVENTION

Sonar devices that transmit sound waves have been used previously to obtain information about underwater articles, including fish, structures and obstructions, and the bottom. The sound waves travel from a transducer mounted to a bottom surface of the vessel through the water. The sound wave transmits from the sonar devices in diverging patterns. The sound waves contact underwater articles, which create return echoes. The transducer receives the return echoes and the sonar device analyzes the received echoes. A display device displays representations of the received echoes, for locating fish and other underwater articles.

Known side scan sonar devices locate the transducer in a vessel towed by the watercraft (e.g., a "tow fish"). The tow fish is coupled to the sonar display by a long cable. The length of the cable will depend on the depth of the water and other conditions. For typical applications, the length of the cable is 50 feet or more. Moreover, it is not uncommon for the cable to be hundreds or even thousands of feet long. As can be appreciated by some having ordinary skill in the art, a fisherman or recreation user desiring to have side scan images would be hindered by such an arrangement. For example, maneuvering or turning of the watercraft in different directions is difficult, as well as tangling of the sonar cable with fishing or other recreational equipment. Such known tow fish transducers are maintained at a consistent distance from the bottom of the body of water. This distance is intended to provide desired or optimized resolution and field of view. A consistent distance inhibits, if not prohibits, modifying known transducers for side scan applications (or mounting known side scan transducers to watercraft) because the distance between the transducer to the bottom of the water will vary as the watercraft travels due to the varying depth of the water.

Accordingly, it would be advantageous to provide a sonar imaging system that is coupled to the watercraft, rather than being coupled by a flexible cable and towed behind the watercraft. It would also be advantageous to provide sonar imaging system mountable to a motor (such as a trolling motor), a transom of the watercraft, or to the hull of the watercraft. It would also be advantageous to provide sonar imaging system operable at multiple resonant frequencies for optimized performance at varying bottom depths. It would be desirable to provide for a sonar imaging system for mounting to a watercraft having one or more of these or other advantageous features.

BRIEF SUMMARY OF THE INVENTION

In view of the above, it is an objective of the present invention to provide a new and improved sonar imaging system that is capable of being connected to a watercraft, such as a fishing boat. It is a further objective to provide a new and improved sonar imaging system that provides imaging of the underwater environment to the sides of the watercraft. It is a still further object of the invention to provide a new and improved sonar imaging system that additionally provides imaging of the underwater environment below the watercraft.

The system of the present invention realizes several advantages over the traditional towfish side scan sonar systems. It is more convenient because there are no deployment requirements of getting the transducer towfish into the water, no cable handling hassles and tangles, no precise speed control requirements to keep the towfish at the right depth and prevent it from hitting the bottom, no complicated large diameter turn requirements to prevent the towfish from hitting the bottom when you want to turn the boat, and no worries about getting the lines and cable tangled when fishing. The system of the present invention can even be used for imaging by a watercraft in reverse.

The system of the present invention is also more secure than the traditional side scan sonar systems. There is no chance of snagging the towfish or loss of transducer. Most fishing is done near bottom rises, drop-offs and underwater structures. Most natural and especially man-made lakes have rocks, stumps and standing timber that can snag a towfish and cause damage or loss of the equipment.

Additionally, the system of the present invention provides more area of coverage. The watercraft mounted transducer of the present invention does not limit the turning radius of the vessel, and it provides the ability to image closer to the shore and near structure. This allows for faster and more complete imaging. The system also provides more accurate target locations. Having the transducer mounted to the watercraft allows for precise target locations. With a towed side scan system the crew has to take into account how much cable is deployed and how deep the towfish is to determine how far back behind the boat the target is. With the watercraft mounted system of the present invention, this is not a factor. To provide even more accurate images, the system of the present invention provides the offset necessary to account for the X and Y distance between the side imaging transducer and the GPS antenna. The system of the present invention also has a better aspect at some targets because, in some cases, the view from the surface can "see" better over rises and into holes than the towed side scan sonar at a fixed distance from the bottom. The system of the present invention can also be mounted to smaller watercraft such as canoes, kayaks and other personal watercraft.

In a preferred embodiment of the present invention, the system includes features to correct for watercraft mounted nature of the transducers. Unlike using a towfish in which data collection takes place at a fixed distance from the bottom (same aspect angle at any depth of water), and in which the towfish dynamics are decoupled from vessel motion in rough seas, the system of the present invention compensates for these differences. In a preferred embodiment of the present invention, the depression angle of the side imaging elements is increased from about 20 degrees to about 30 degrees. This provides better coverage at the greater aspects. Also in a preferred embodiment, the side elements are designed to be dual frequency to provide a trade-off between area of coverage and resolution. Transducer element shielding and software filters are also provided in a preferred embodiment to eliminate vessel noise sources such as spark plug and electrical system EMI (solenoids, VHF radios, electric motors, etc.). In one embodiment of the present invention, the system includes passive yaw, tilt transducer minimization or compensation using floating oil bath self leveling. In another embodiment the system includes active yaw, tilt transducer minimization or compensation via tilt sensors and motors.

Additional features over traditional side scan provided by embodiments of the present invention include fish identification and alarm in side beams. Typical side scan systems consider fish as unwanted noise. Screen capture and playback functioning like a digital camera with the ability to store an image, review already stored images, erase unwanted images, and download images to a computer are also provided in embodiments of the present invention. Unlike typical data recording when a user sees an image on the screen they can simply push a capture button, instead of having to start recording before the user sees the target. Preferred embodiments also provide zoom capability that allows a user to view only the right or left side at a time and also zoom into a particular area either using the cursor or a touch screen. Further, the ability to use standard image enhancement software (algorithms) either in the unit or post processed is provided to allow for color, contrast, brightness, auto fix, edge detect, etc.

In a preferred embodiment of the present invention, a down beam is provided along with the side imaging. This provides for more complete around the boat information (both sides and straight down). It is not limited to a single beam. One embodiment utilizes a 200 kHz/50 kHz dual beam. Other embodiments may use a quad beam or even six beam. In preferred embodiments, at least one view shows both down beam and side imaging. This provides the ability to better relate length of shadow information to the size of the underwater target. It also provides for a quick means for verification of target location. After a target is located off to a side, the boat can be driven directly over the target and located in the down beam for precise location.

In a still further preferred embodiment, GPS imaging is also provided with the side imaging. In such embodiments a cursor mode allows a user to move the cursor over a target of interest on the screen image and set a waypoint for the location of the structure. The GPS history may be used to determine the distance back and the sonar may be used to determine the distance to the side. The GPS speed can be used to provide the screen scroll rate to provide more accurate front to back target dimensions. Without GPS or a speed sensor a fast scroll rate and a slow boat speed will elongate targets and a slow scroll rate and a fast boat speed will shorten targets. The corners of screen captures can be marked so that large area composite mosaic images can be generated in the unit or post processed later. Preferably, one view that shows both side imaging and navigation information is provided. This makes it easier to follow tracks and provide efficient area coverage.

In accordance with these objectives, an embodiment of the present invention provides a sonar imaging system for a watercraft including a transducer coupled to the watercraft. Preferably, the system includes at least one side scanning element and at least one bottom scanning element and an electronic control head unit coupled to the transducer that is configured to display sonar images. In one embodiment of the present invention, the sonar imaging system includes circular downward acoustic elements and rectangular acoustic elements. The present invention further relates to a software filter configured to remove noise generated by a spark plug or other operation of a motor for the watercraft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
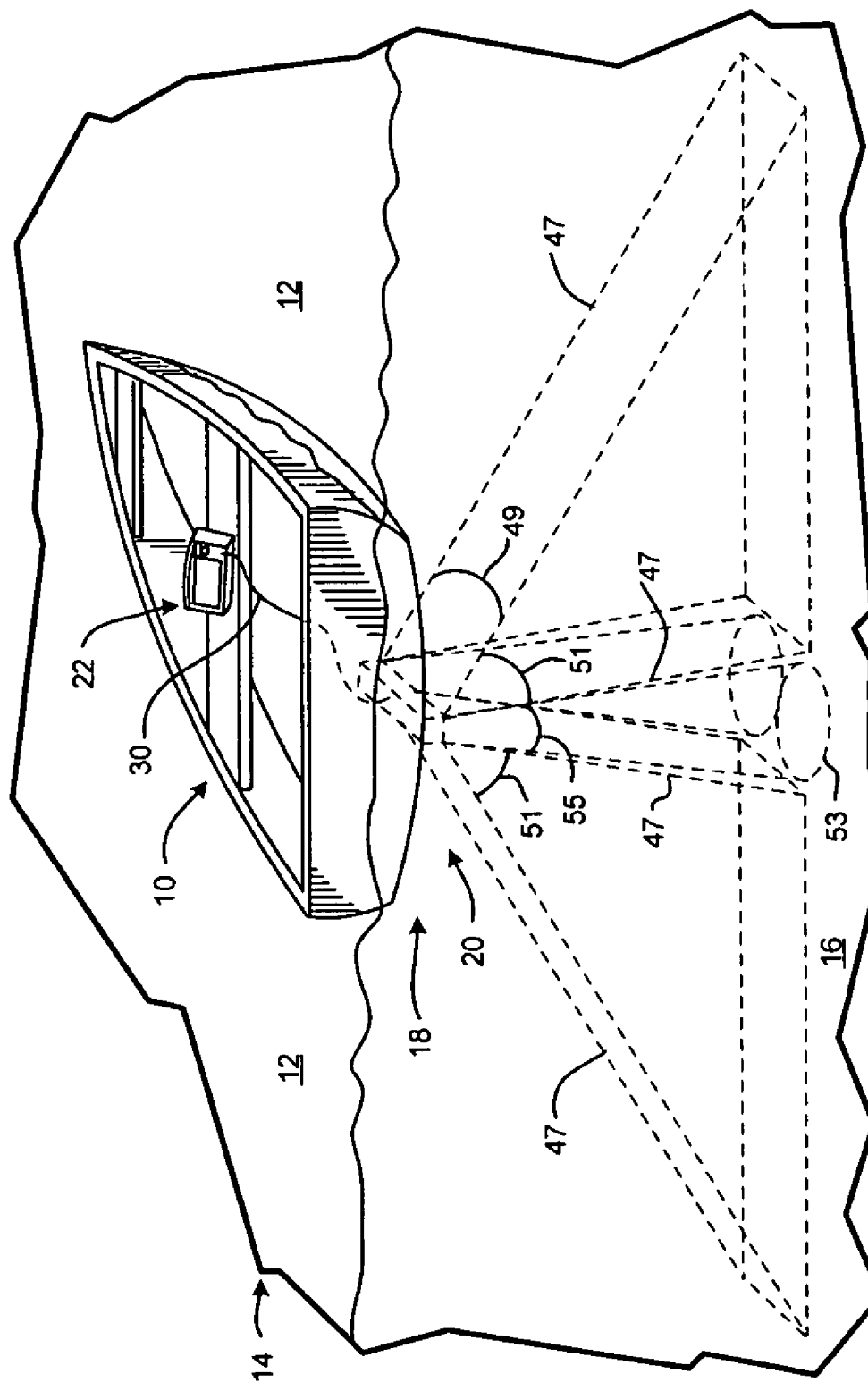
FIG. 1 is an isometric illustration of one embodiment of a fishing vessel mounted sonar imaging system of the present invention.
Figure 2:
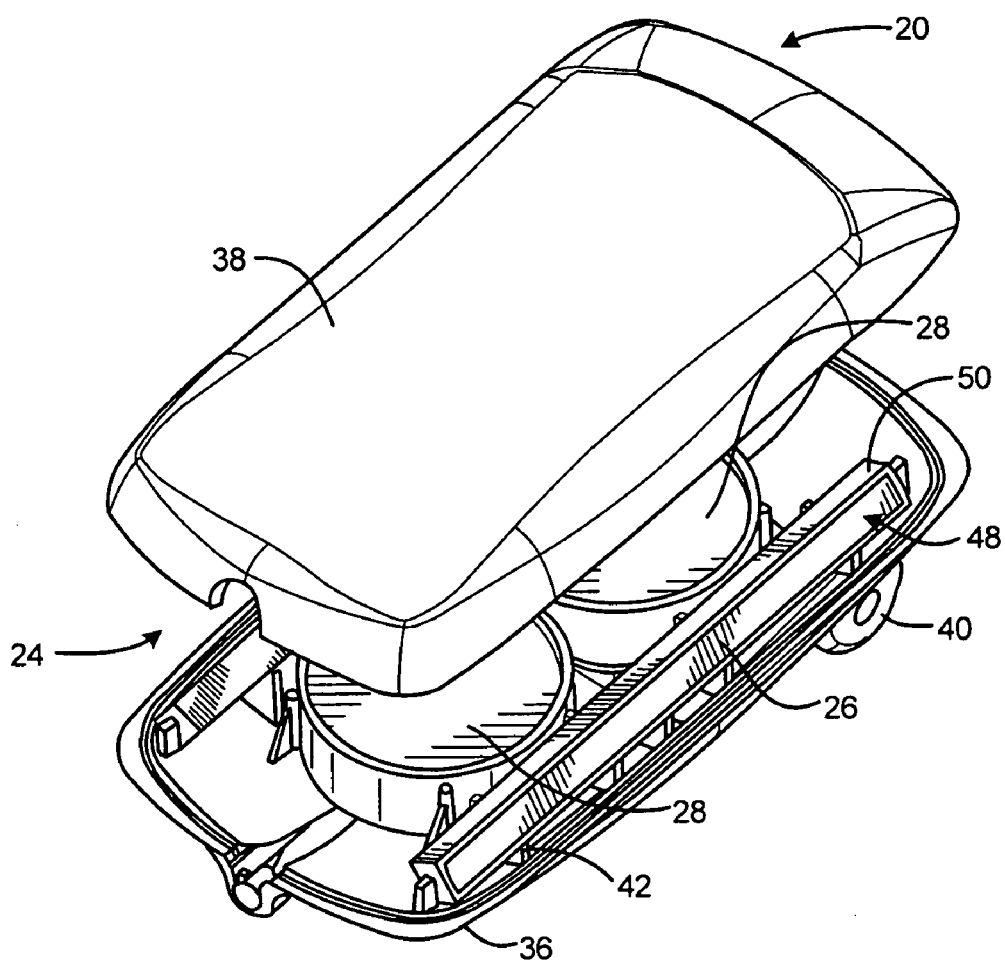
FIG. 2 is an exploded bottom view isometric illustration of an embodiment of a transducer module constructed in accordance with the teachings of the present invention.
Figure 3:
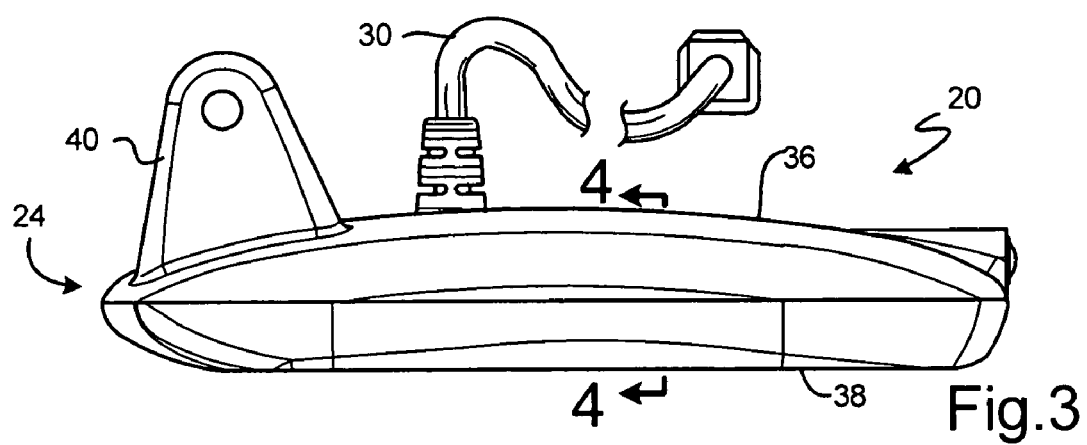
FIG. 3 is a side view illustration of the assembled transducer module of FIG. 2.

Turning now to the drawings, FIG. 1 illustrates a vessel (shown as a watercraft 10) on a surface 12 of a body of water 14 having a bottom 16. A sonar imaging system 18 is mounted or coupled to the watercraft 10 (e.g., rather than being towed by a flexible cable behind the watercraft 10) and is configured to scan the water below and to the sides of the watercraft (i.e., a boat mounted side scan sonar system). The sonar imaging system 18 comprises a transponder or transducer 20 coupled to an electronic control head unit 22 located at the watercraft 10. The sonar imaging system 18 repetitively scans the body of water 14 for fish and other underwater articles with transmissions of acoustic waves and receiving and displaying the sonar returns, with the duration of receiving being a function of the determined depth from a prior transmission.

Referring to FIGS. 2-11, the transducer 20 includes a housing 24, a sonar array (in the form of a plurality of acoustic elements shown as side scan elements 26 and downward scan element 28), a cable 30 coupling the housing and acoustic elements to the electronic control head unit 22. The acoustic elements are configured for acoustic wave transmitting and receiving by a transmitter and a receiver that are operated by the electronic control head unit 22 for scanning the body of water 14, particularly for locating fish, as well as other underwater articles, and determining characteristics about the bottom 16 (see FIG. 1) of the body of water. The acoustic or sonar wave beams are transmitted based on the configuration of the acoustic elements.

The housing 24 comprises a top housing portion 36 and a bottom housing portion 38. The top housing portion 36 includes a pair of mounting members 40 extending from the front portion of the top housing portion 36. Both top housing portion 36 and bottom housing portion 38 have projections extending towards the interior of the housing to provide structural support for the housing assembly, and to provide locating and positioning support for the acoustic elements. A series of projections 42 include v-shaped recesses or notches 44 to form a cradle that receives side scan elements 26. Recesses 44 are configured (shaped and positioned) to support the rectangular shaped side scan elements 26 in a position and orientation (direction) to provide a particular, desired, predetermined acoustic beam performance.

Figure 5:
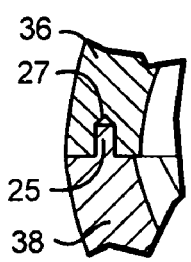
FIG. 5 is a partial section view of the housing joint of the assembled transducer module of FIG. 4 taken at section A.
Figure 4:
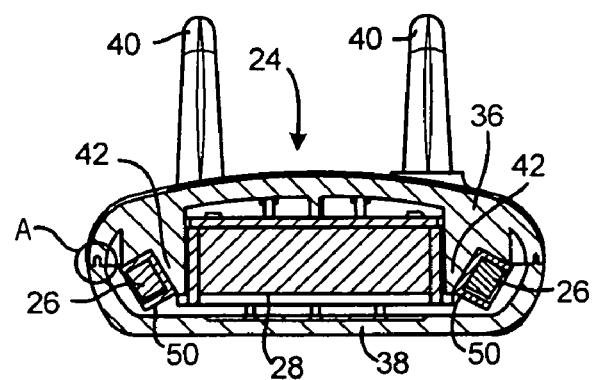
FIG. 4 is an end section view of the assembled transducer module of FIG. 3 taken about section line 4-4.
Figure 6:
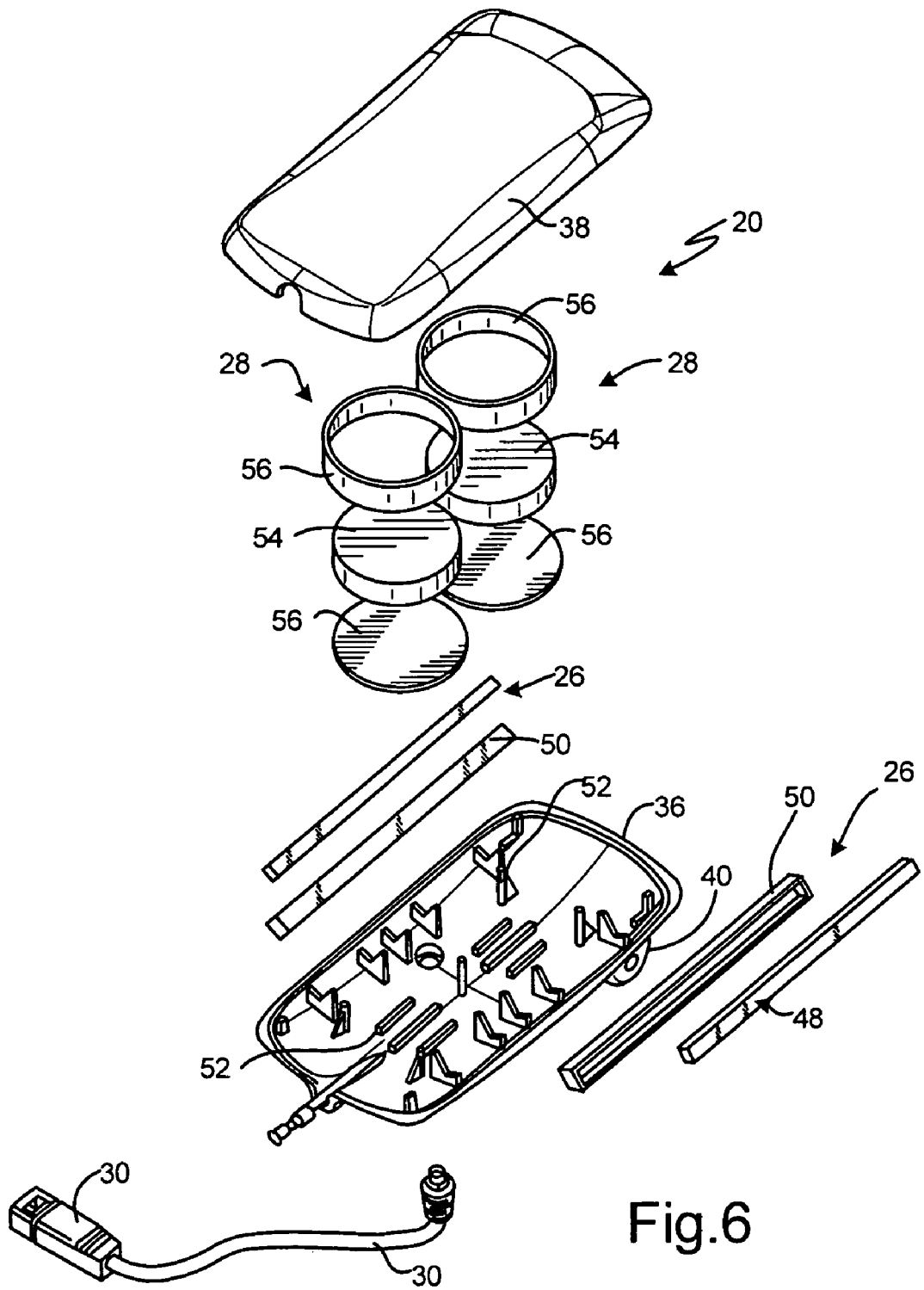
FIG. 6 is a fully exploded bottom view isometric illustration to the transducer module of FIG. 2.
Figure 7:
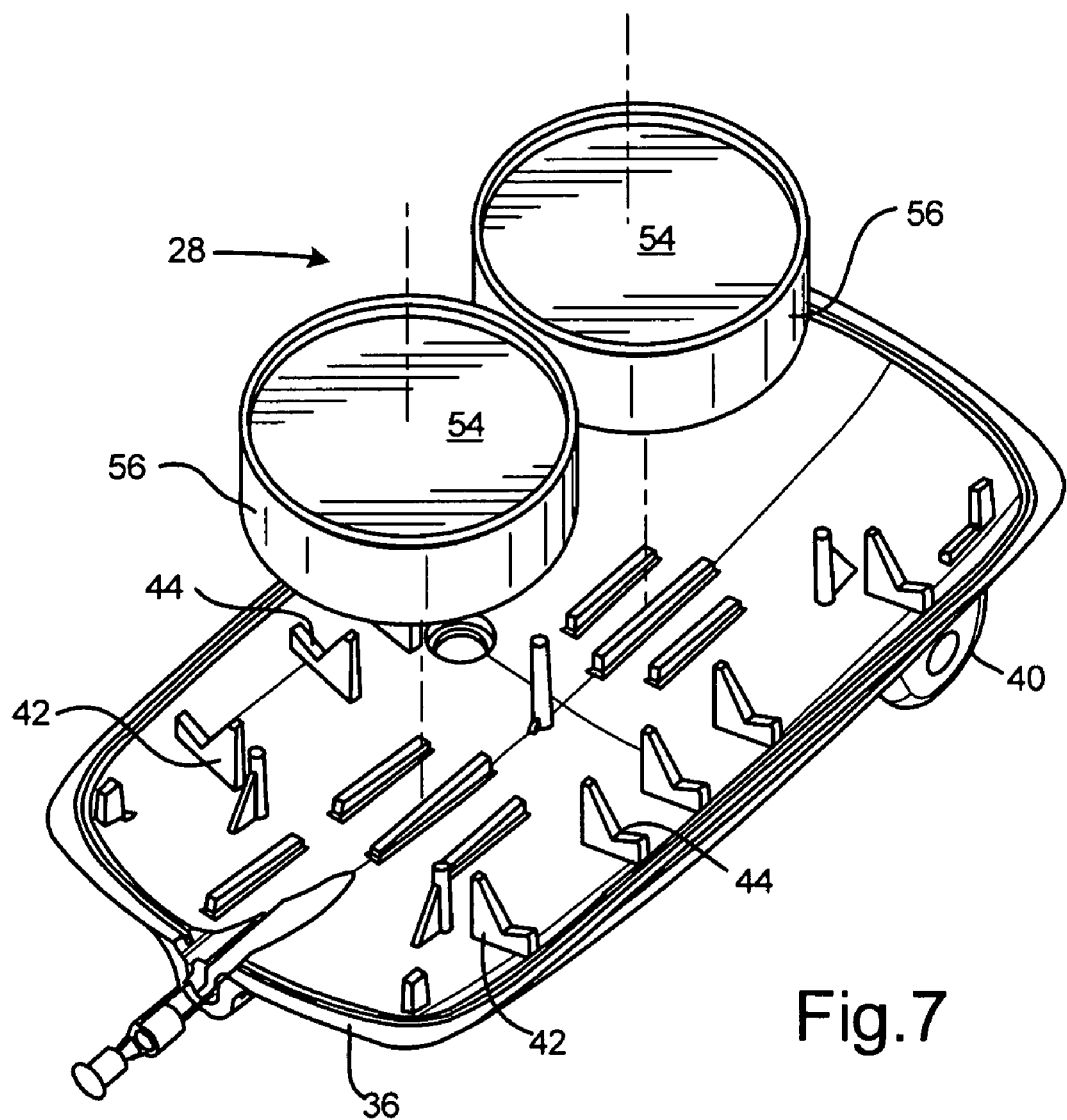
FIG. 7 is a partial exploded view isometric illustration of a top housing assembly showing placement of downward looking sonar elements.
Figure 8:
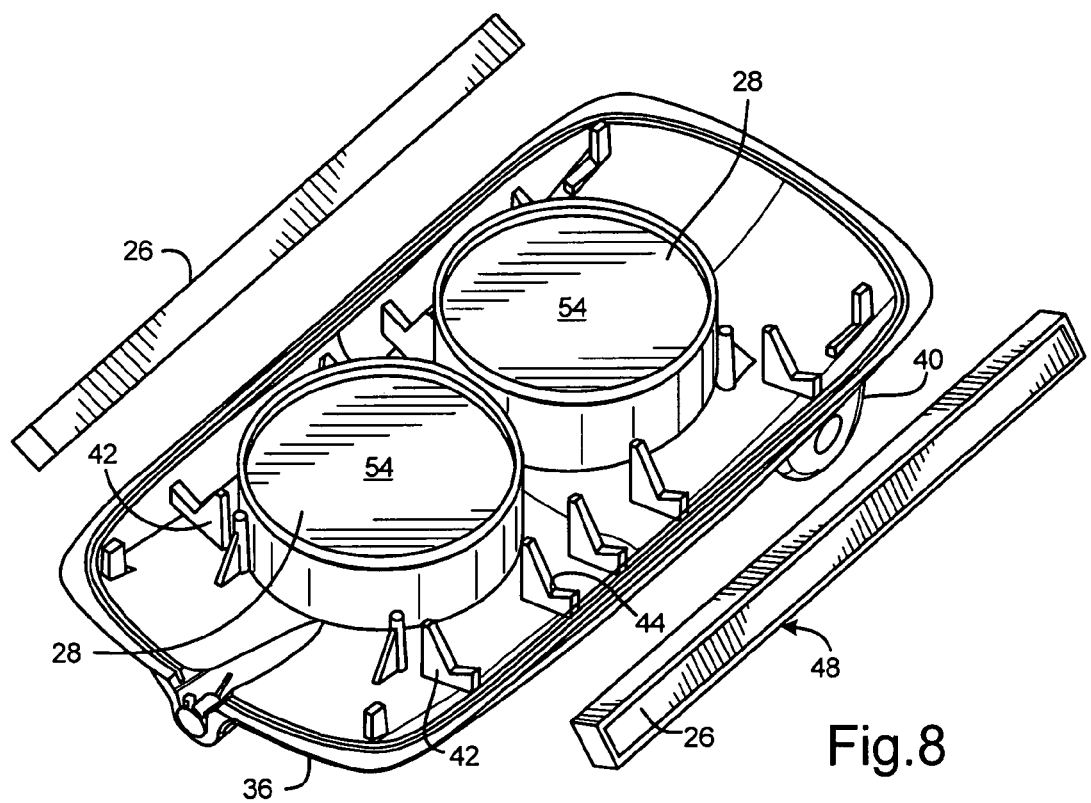
FIG. 8 is a partial exploded view isometric illustration of a top housing assembly showing placement of downward looking sonar elements and side scan sonar elements.
Figure 9:
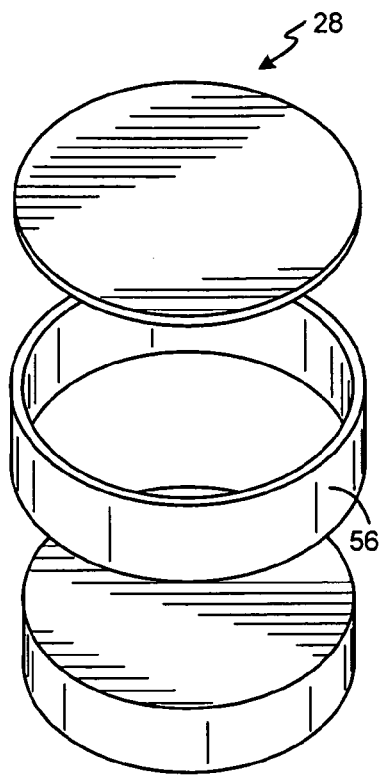
FIG. 9 is an exploded isometric illustration of an embodiment of a downward looking sonar element suitable for application in the sonar imaging system of the present invention.
Figure 10:
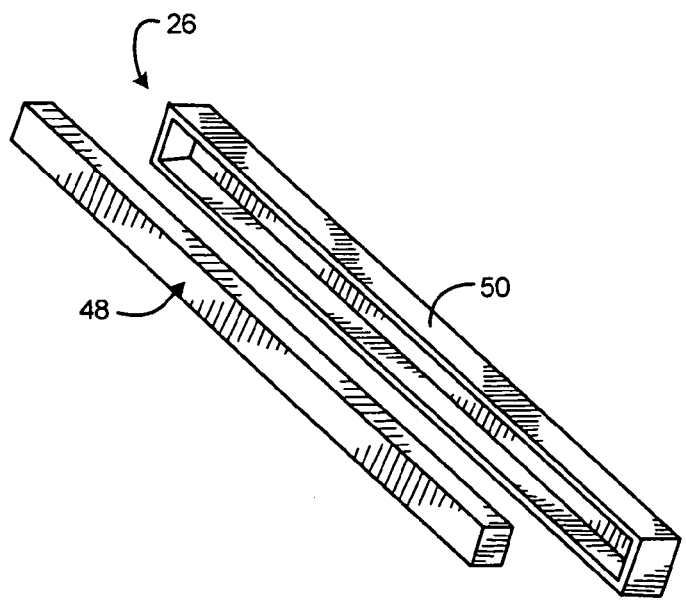
FIG. 10 is an exploded isometric illustration of an embodiment of a side scan sonar element suitable for application in the sonar imaging system of the present invention.
Figure 11:
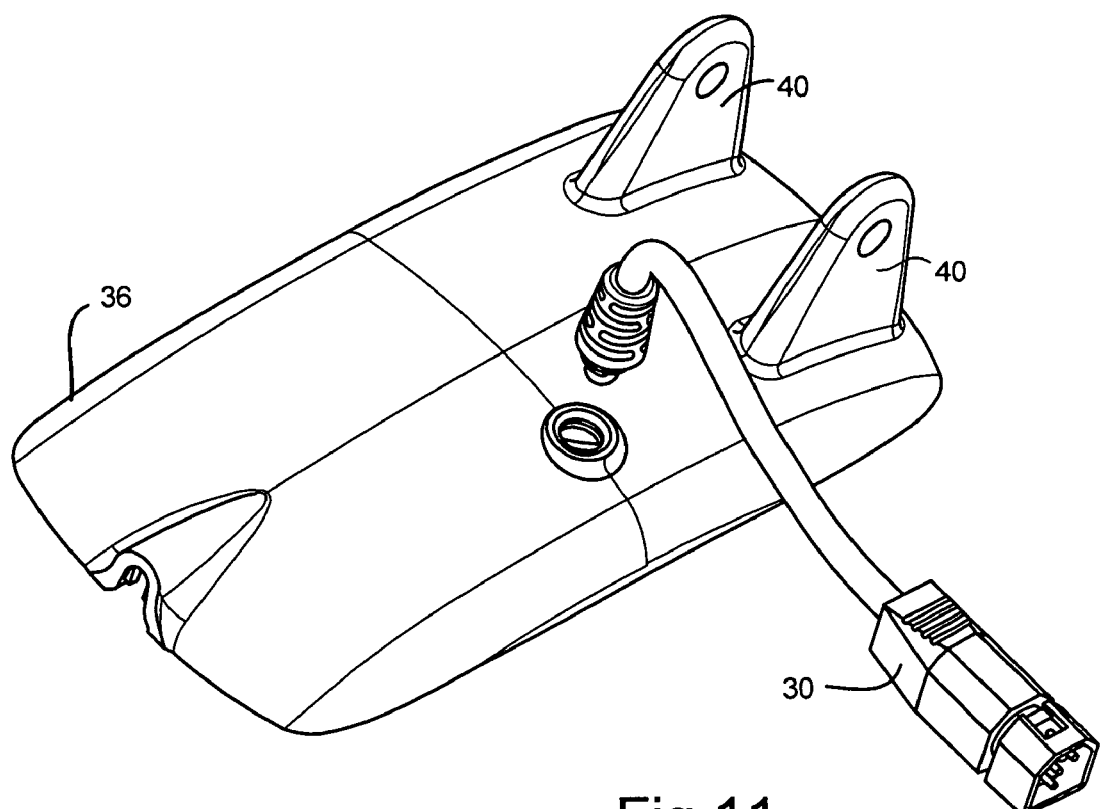
FIG. 11 is an isometric illustration of one embodiment of a cable attachment for the sonar imaging system of the present invention.

The housing 24 is coupled to the watercraft 10 by any of a variety of methods. The housing 24 is coupled to the watercraft 10 so that there are no obstructions to either side of the housing (i.e., to block the operation or affect the performance of the acoustic elements). According to a preferred embodiment, the housing 24 is coupled to the watercraft 10 along the centerline of the watercraft so that the housing 24 extends about 0.25 inches below the watercraft. According to an exemplary embodiment, mounting members 40 of the top housing 36 are coupled to a mounting bracket 46 that is coupled to a trolling motor. According to an alternative embodiment, the mounting members 40 are mounted through the hull of the watercraft 10 (e.g., with a support shaft passing through a hole in the hull). According to an alternative embodiment, the mounting members are coupled to a bracket that is coupled to a transom of the watercraft 10. Alternatively, the housing may be coupled to the watercraft at any of a variety of positions and at any of a variety of depths below the surface of the water. The top housing portion 36 may be coupled to the bottom housing portion 38 by any of a variety of conventional methods (e.g., snap fit engagement, adhesive, ultrasonic welding, fusion, heat welding, fasteners such as screws, bolts, rivets, or the like). As illustrated in FIG. 5, one embodiment of the housing 24 utilizes a mounting rib 25 that is received in a mounting channel 27 to locate the top and bottom housing portions 36, 37 together. In one embodiment, the rib 25 is welded into the channel 27 such as, e.g. via ultrasonic welding or the like.

The side scan elements 26 are located along the sides of the housing 24 and are configured to scan the water to the sides of the transducer 20 (and watercraft 10) with sonar or acoustic beams 47.

The dimensions of side scan elements 26 are configured to provide the desired sonar beam pulse 47. The size of the wave front created by the transmitted acoustic beam affects the resolution of the return echo and thus the quality of the imaging of subsurface articles displayed by the sonar device. Generally, a wide beam provides diffused return echoes that are particularly suited for indicating the presence of fish in a wide area around the watercraft. The signal displayed for fish is referred to as a "fish arch" or other indicia or icon. A narrower beam on the other hand provides a more detailed return echo or signal representative of the subsurface article. The narrow beam covers a smaller area but provides additional definition of the article. A wider beam accordingly is useful for providing indications of the presence of schools of fish in a wide area around the vessel as well as other underwater articles. The narrow beam is useful for providing details of the underwater article or the bottom.

A sonar beam becomes narrower (thereby providing better resolution) as the corresponding dimension of the acoustic element becomes larger, and a sonar beam becomes wider as the corresponding dimension of the acoustic element becomes smaller (e.g., a small height provides for a beam with a relatively wide vertical angle, and a large length provides for a beam with a relatively narrow horizontal angle). According to an exemplary embodiment, the side scan elements 26 are configured to provide a narrow horizontal beam width and a wide vertical beam width. According to a preferred embodiment, the side scan elements have a rectangular shape. According to a particularly preferred embodiment, the rectangular shaped side scan elements 26 are between about 3 inches to about 7 inches long by between about 0.125 inch and about 0.50 inch wide. According to a particularly preferred embodiment, the rectangular side scan elements 26 are about 4.5 inches long and about 0.25 inch wide. In such a particular preferred embodiment shown schematically in FIG. 1, the side scan elements 26 transmit the acoustic beam 47 with a horizontal angle 49 of about 2 degrees and a vertical angle 51 of about 50 degrees.

Referring to FIGS. 1, 4, 6, and 7, the side scan elements 26 are supported (e.g., captured, cradled, secured, etc.) by projections 42 in housing 24 so that their exposed surface 48 is orientated at a predetermined direction and angle. According to an exemplary embodiment, the side scan elements 26 are supported by the housing so that the exposed surface is orientated outward from the transducer 20 and toward the bottom of the water (e.g., downward from the watercraft 10 and surface of the water). According to a preferred embodiment, side scan elements 26 are angled downward between about 20 degrees and about 40 degrees, depending on the resonant frequencies. According to a particularly preferred embodiment, the side scan elements 26 are orientated downward at about 30 degrees for resonant frequencies of between about 260 KHz and about 462 KHz. According to alternative embodiments, the side scan elements are mounted with any of a variety of orientations and directions, depending on types of depths the transducer is intended to be used in (e.g., lake, river, ocean, etc.) and on the configuration of the transducer sonar beams (e.g., as determined by the size and dimensions of the acoustic elements). Preferably, the side scan elements 26 are coupled to the housing 24 with an epoxy. Alternatively, the side scan elements are coupled to the housing by any of a variety of adhesives or bonding or joining materials or techniques.

According to a preferred embodiment, side scan elements 26 are made from a piezoelectric ceramic. According to a particularly preferred embodiment, the side scan elements are composed of lead zirconate titanate ("PZT") commercially available from Morgan Electro Ceramics of the United Kingdom. According to alternative embodiments, the side scan elements may be made from any of a variety of piezoelectric materials capable of converting electric energy into mechanical energy and converting mechanical energy into electrical energy.

An acoustic shield 50 (e.g., shielding, decoupler, barrier, absorber, etc.) surrounds all but one side of side scan elements 26 to prevent sonar pulses from being transmitted, and sonar returns received by, acoustic elements in all but the desired direction of scanning. The acoustic shield 50 may be made from any of a variety of materials that are poor conductor of sonar energy, such as cork, foam, polymers, or other low density materials, and the like.

The downward scan element 28 is located along the bottom middle of the housing 24 and is configured to scan the water below the transducer 20 (and watercraft 10) with sonar or acoustic beams 53 (see FIG. 1). According to a preferred embodiment, downward scan element 28 comprises a pair of transducer elements coupled together. According to alternative embodiments, the downward scan element comprises a single element or more than two elements.

The dimensions of downward scan element 28 are configured to provide a desired sonar beam pulse. According to an exemplary embodiment, the downward scan element 28 is configured to provide a relatively narrow sonar beam (e.g., for desired or optimum resolution). According to a preferred embodiment, the downward scan elements 28 have a cylindrical shape. According to a particularly preferred embodiment, the cylindrical shaped downward scan elements 28 have a diameter of between about 1 inch to about 2 inches and a height of between about 0.2 inches and about 0.5 inches. According to a particularly preferred embodiment, the cylindrical downward scan element 28 has a diameter of about 1.67 inches and a height of about 0.425 inch. In such a particular preferred embodiment shown in FIG. 1, the downward scan elements 28 transmit the acoustic beam 53 with an angle 55 of about 20 degrees. According to alternative embodiments, the side scan elements and the downward scan elements may have any of a variety of dimensions, positions, and orientations based on desired performance, manufacturing, and costs.

The downward scan element 28 are supported (e.g., captured, cradled, secured, etc.) by projections 52 in housing 24 so that its exposed surface 54 is orientated at a predetermined direction and angle. According to an exemplary embodiment, the downward scan elements 28 are supported by the housing so that the exposed surface is orientated vertically downward from the transducer 20 and toward the bottom of the water. Preferably, the downward scan elements 28 are coupled to the housing 24 with an epoxy. Alternatively, the downward scan elements are coupled to the housing by any of a variety of adhesives or bonding or joining materials or techniques.

According to a preferred embodiment, the downward scan element 28 are made from a ceramic. According to a particularly preferred embodiment, the downward scan element 28 are composed of lead zirconate titanate ("PZT") commercially available from Morgan Electro Ceramics of the United Kingdom. According to alternative embodiments, the downward scan elements may be made from any of a variety of piezoelectric materials capable of converting electric energy into mechanical energy and converting mechanical energy into electrical energy.

An acoustic shield 56 (e.g., shielding, decoupler, barrier, absorber, etc.) surrounds all but one side of the downward scan elements 28 to prevent sonar pulses from being transmitted, and sonar returns received by, acoustic elements in all but the desired direction of scanning. The acoustic shield 56 may be made from any of a variety of materials that are poor conductor of sonar energy, such as cork, foam, polymers, or other low density materials, and the like.

The return sonar signal from the bottom reflection carries details about the bottom 16. The return sonar signal from the side reflection carries details about the sides and bottom 16 to the side of the watercraft 10. The sonar return data is communicated or sent to be processed by the transducer 20 to the electronic control head unit 22 for display of images or symbols representative of the received return echoes of the acoustic wave beams. The transmission of an acoustic pulse and the reception of reflected echoes is a transmit/receive cycle, which is referred to herein as a T/R cycle. The wavefront of the acoustic pulse travels from the transducer 20, to the bottom 16 of the body of water 14, and reflects back to the transducer which receives the reflected echoes of the acoustic wave beam. The duration of the T/R cycle depends on the depth of the water. Typically, the T/R cycles of transmission and reception are two to four times per second for deep water and more frequently, such as one-thirtieth of a second, for shallower waters.

According to a preferred embodiment, the transducer 20 does not include any electronics; rather the electronics are located in the electronic control head unit 22. The images include a bottom profile, objects along the bottom or in the water (e.g., fish), and the like. The display may also display informational subject matter (e.g., depth, water temperature, velocity of the watercraft 10, etc.).

Figure 12:
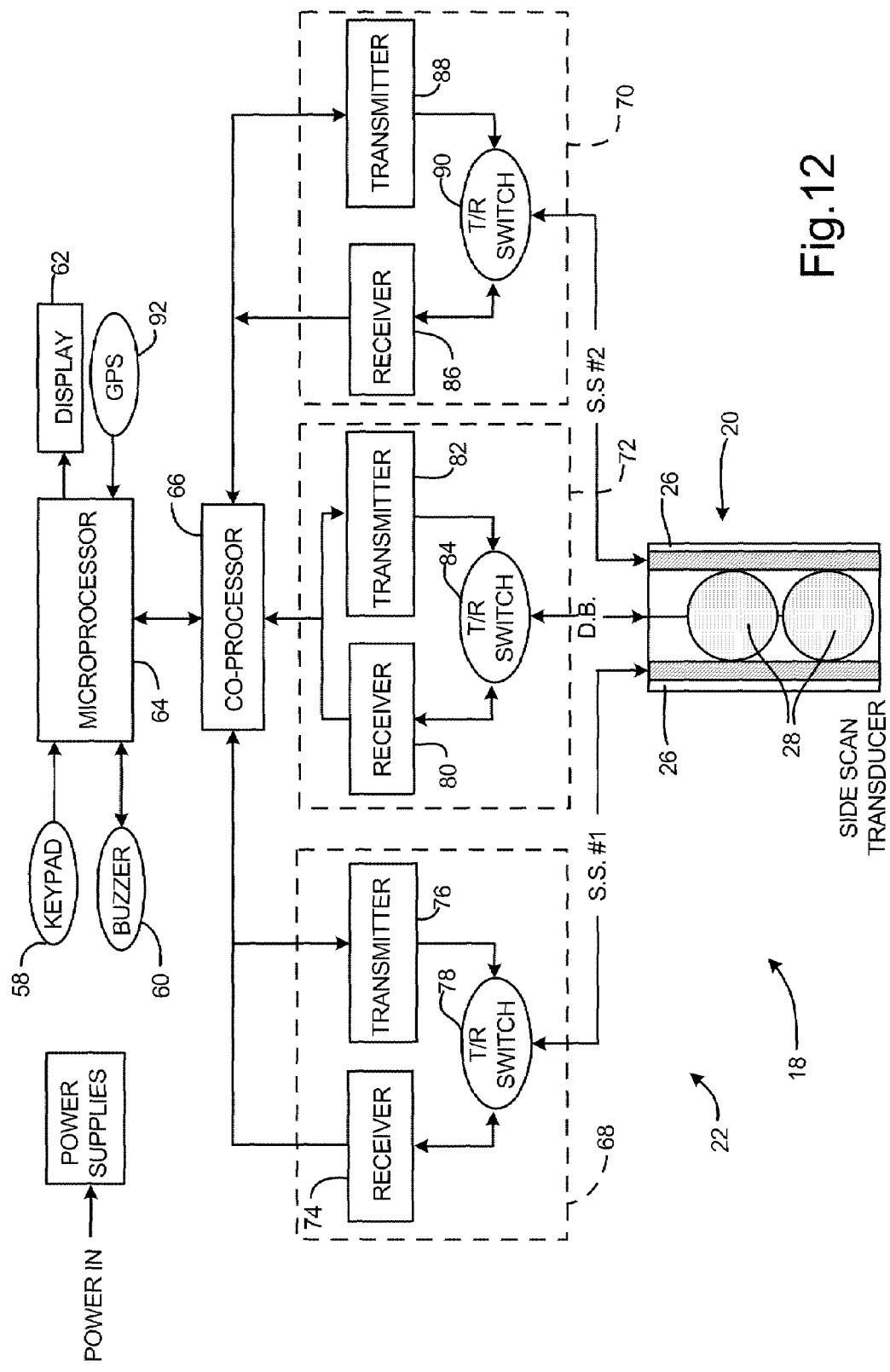
FIG. 12 is a simplified system block diagram of an embodiment of the sonar imaging system of the present invention.
Figure 13:
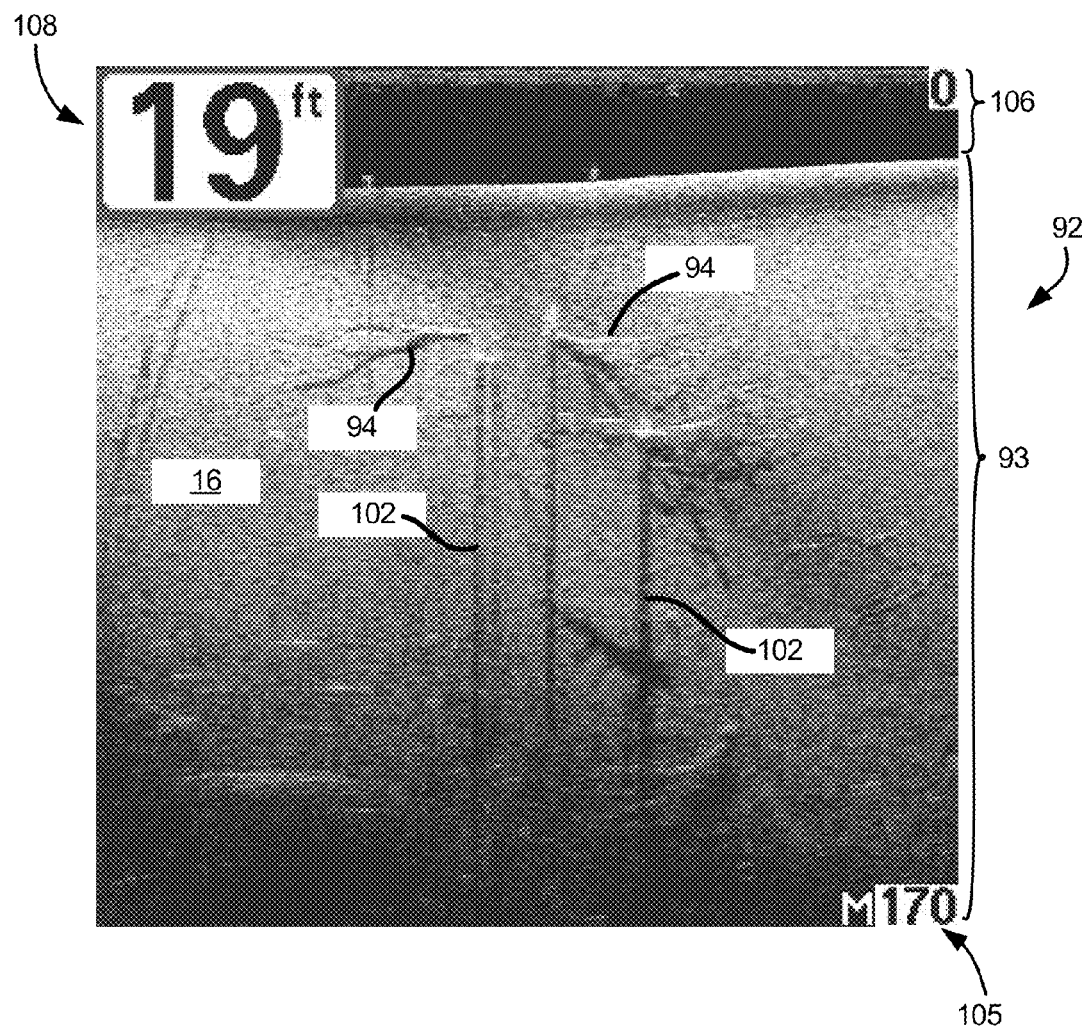
FIGS. 13-18 show examples of sonar images as they appear on a display screen.
Figure 14:
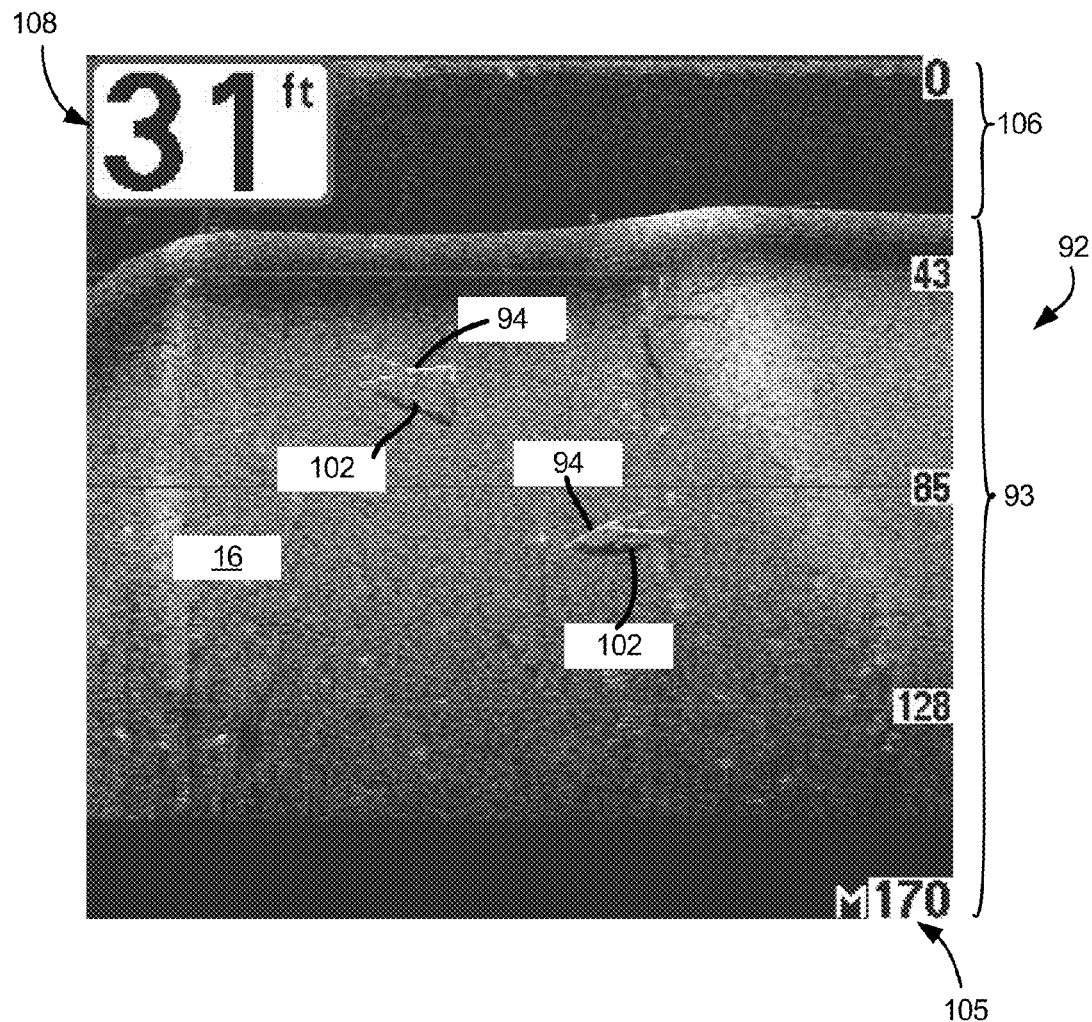
Figure 15:
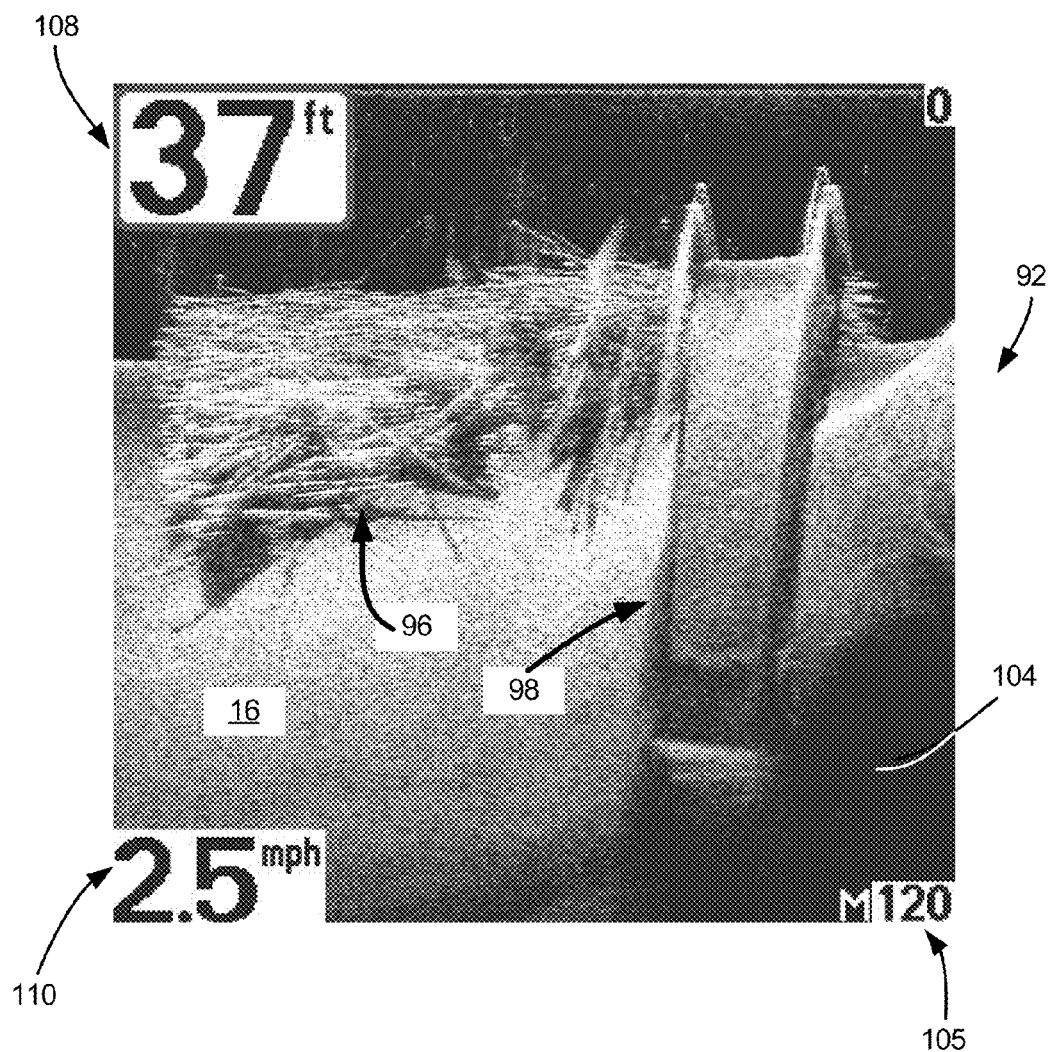
Figure 16:
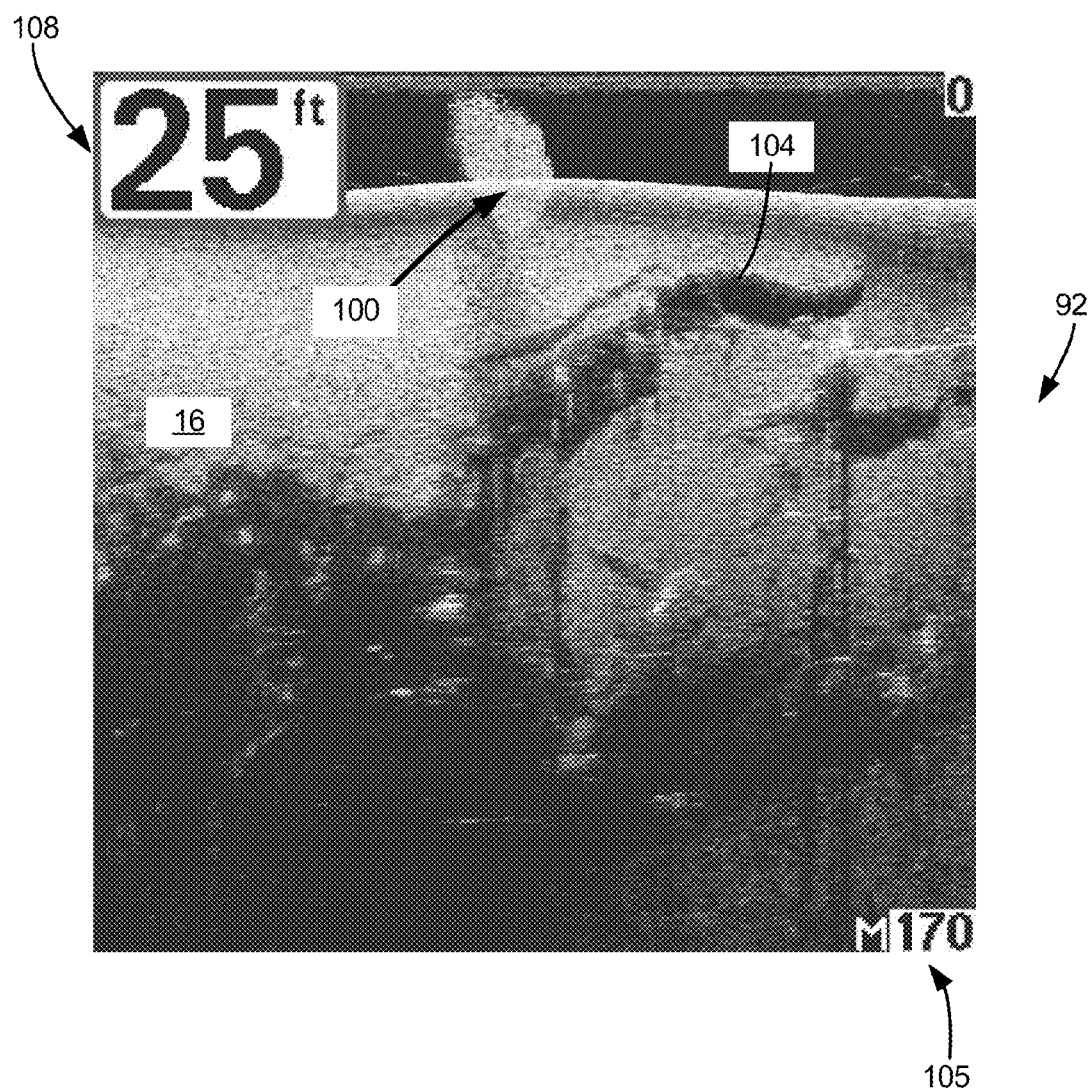
Figure 17:
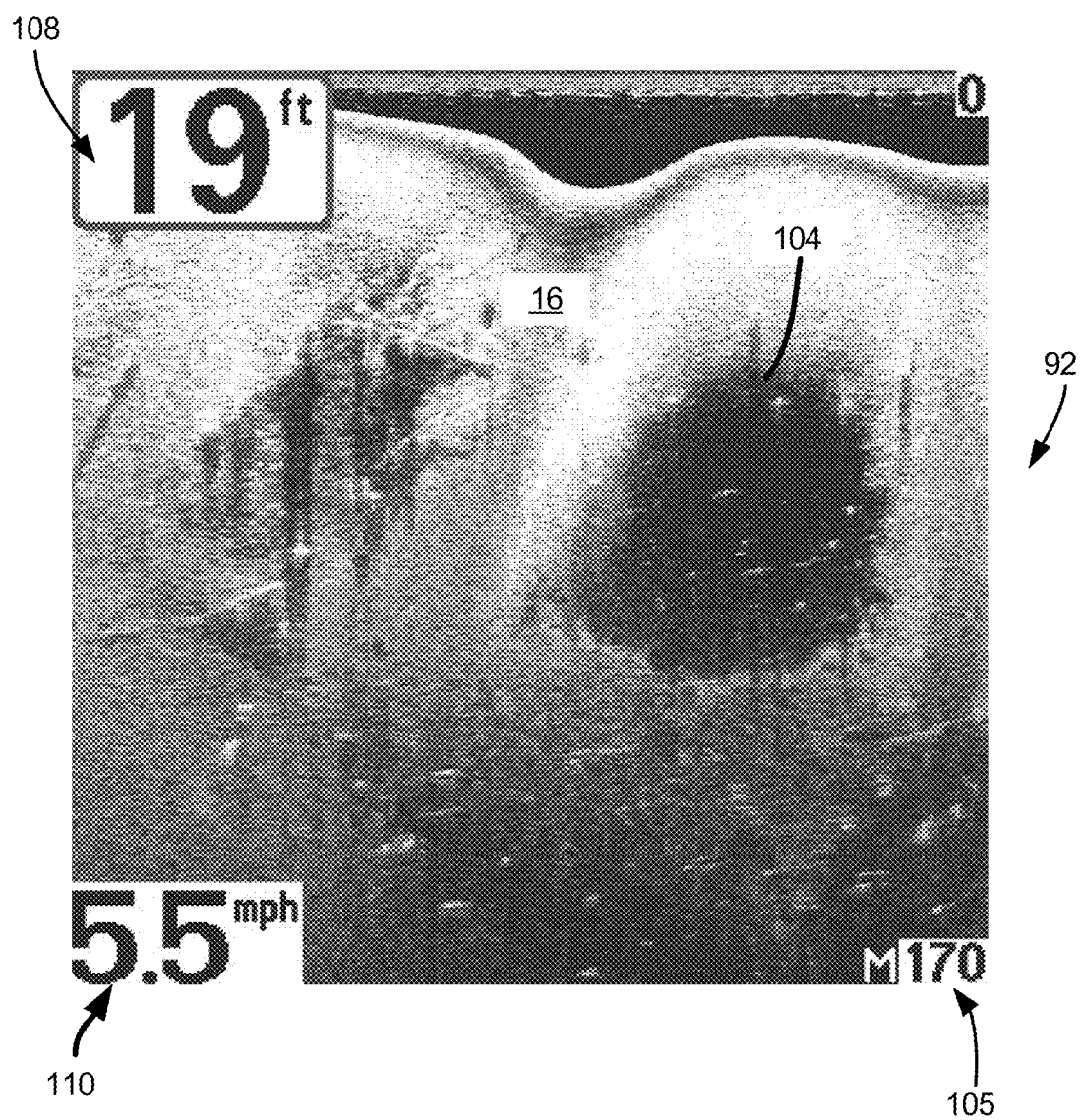
Figure 18:
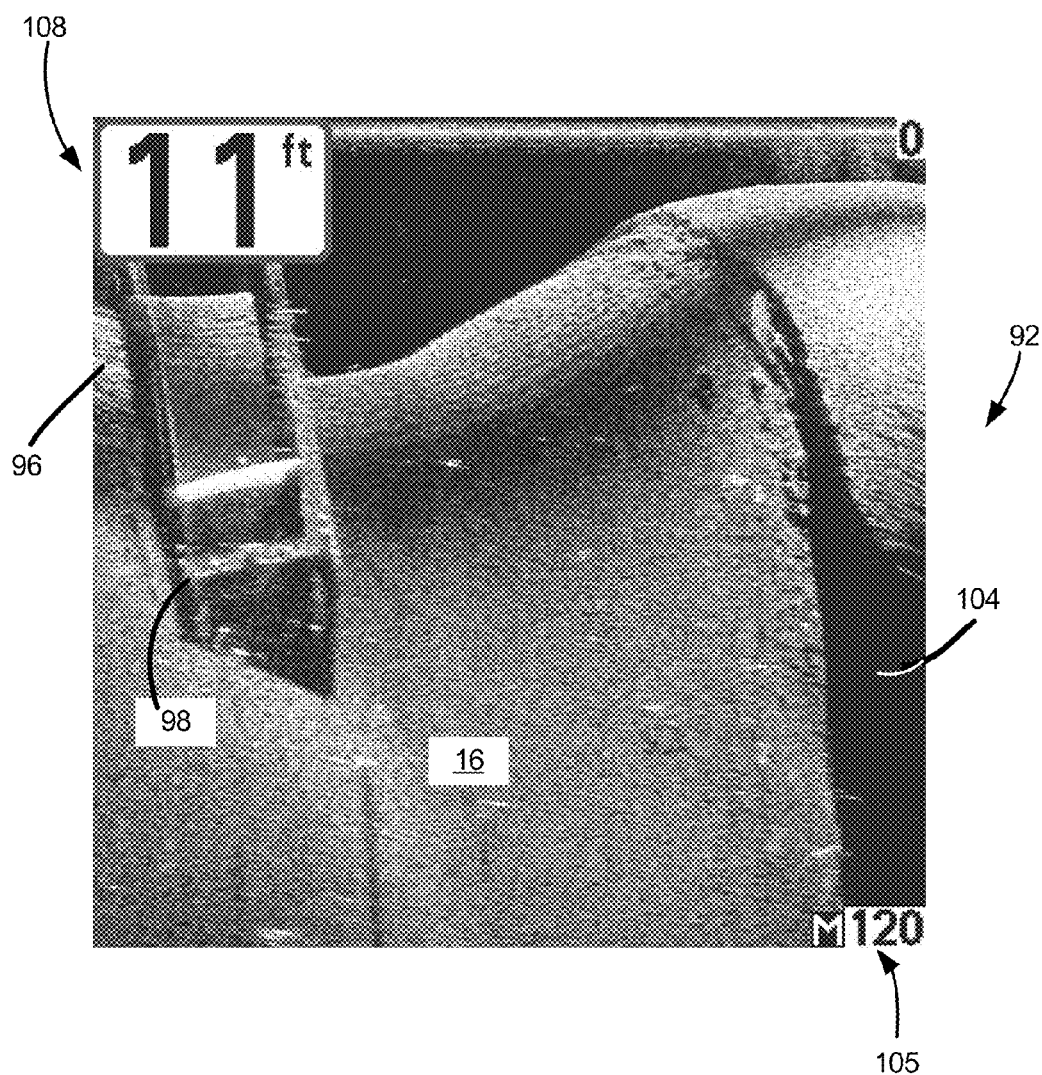

Referring to FIG. 12, the electronic control head unit 22 is coupled to a power supply and comprises a user interface (58, 60 and 62), a microprocessor 64, a co-processor 66, a first side scan circuit 68, a second side scan circuit 70, and a bottom scan circuit 72. The user interface is configured to allow for user inputs through a display menu where parameters like depth range, sensitivity, fish alarm and the like. The user interface is shown to comprise a keypad 58, buzzer 60, and display 62. Alternatively, the user interface may have switches or push buttons, or the like.

The microprocessor 64 is coupled to the user interface and is configured to process the data from the co-processor 66 (e.g., control the displayed information, format the information for display, run the operational algorithms, and the like). The microprocessor 64 can be a microcontroller, application-specific integrated circuit (ASIC) or other digital and/or analog circuitry configured to perform various input/output, control, analysis, and other functions described herein. In one embodiment, the micro-processor 64 includes a memory (e.g., non-volatile memory) configurable with software to perform the functions disclosed herein. The microprocessor 64 of the electronic control head unit 22 implements programmed algorithms (e.g., differential amplitude filtering (eliminate engine spark noise), time variable gain optimization-for best image, fish finding algorithms, anti-ringing pulse on transmit for better resolution, and use down beam depth to correct slant angle range information). According to a preferred embodiment, a software filter algorithm is provided to filter certain noise common to operation of watercraft (and noise caused by sparkplug in particular).

During operation of the sonar imaging system 18 in a particularly preferred embodiment, amplitude readings are taken approximately every 0.75 inches, such that 100 feet of depth has 1600 readings. The 0.75 inch amplitude readings from the last transmit/receive cycle (T/R cycle) are saved into computer memory. For each of these 0.75 inch amplitude readings, present and previous amplitude readings the software conducts the following test: Is "present reading"–"previous reading">x. If Yes, then substitute "previous reading" for "present reading". If no, use the present reading. The microprocessor 64 also filters the signals, sorts sonar target returns from the bottom and fish, calculates display range parameters and then feeds the processed signals to the LCD display screen. The display 62 is preferably a graphic display, for example, but not limited on the pixel order. Other displays such as LED, flasher, A-scope and digital segment may alternatively be used. The electronic control head unit 22 may be powered by batteries (e.g., its own dedicated batteries, marine battery, etc.).

The co-processor 66 is coupled to the microprocessor 64 and is configured to collect, process, and pass data to the microprocessor 64 (e.g. generates the transmission frequencies, converts the analog data to digital with A/D converter and sends to the microprocessor 64). The co-processor 66 can be a microcontroller, application-specific integrated circuit (ASIC) or other digital and/or analog circuitry configured to perform the functions disclosed herein. In one embodiment, the co-processor 66 includes a memory (e.g., non-volatile memory) configurable with soft-ware to perform the functions disclosed herein.

The first side scan circuit 68 is coupled to the co-processor 66 and is configured to operate one of the side scan elements. The first side scan circuit 68 comprises a receiver 74, a transmitter 76, and a transmit/receive switch (i.e., T/R switch 78). The second side scan circuit 70 is coupled to the co-processor 66 and is configured to operate the other side scan element. The second side scan circuit 70 comprises a receiver 86, a transmitter 88, and a transmit/receive switch (i.e., T/R switch 90). The bottom scan circuit 72 is coupled to the co-processor 66 and is configured to operate the bottom scan element. The bottom scan circuit 72 comprises a receiver 80, a transmitter 82, and a transmit/receive switch (i.e., T/R switch 84).

The receivers 74, 80, 86 are configured to amplify the signal and conducts signal filtering, base banding-rectification (e.g., remove carrier frequency), and logarithmic conversions (e.g., to obtain a wide range at output) and preferably provide variable receiver bandwidth. The transmitters 76, 82, 88 are configured to drive the acoustic elements and preferably provide variable transmit power and preferably at a high voltage. The T/R switches 78, 84, 90 are configured to switch the first side scan circuit 68 between transmit and receive modes.

According to a preferred embodiment, the electronic control head unit 22 is configured to operate at one or more resonant frequencies, depending on the intended depth and desired resolution. Such a multiple-frequency operation is intended to make up for shortcomings of mounting the transducer to the watercraft 10 caused by the varying distance between the transducer to the bottom 16 of the water 14. According to a particularly preferred embodiment using a dual-resonant frequency and side scan acoustic elements that are about 4.5 by about 0.25 inch, the electronic control head unit 22 is configured to operate at 260 kHz resonant frequency (e.g., wider acoustic wave beam for deeper depth and further distances) and at 462 kHz resonant frequency (e.g., narrower acoustic wave beam for shallower depth and shorter distances). The down beam that is provided in one embodiment utilizes a 200 kHz 150 kHz dual beam. Other embodiments may use a quad beam or even six beam. In preferred embodiments, at least one view of the display shows both the down beam imaging and side imaging. This provides the ability to better relate length of shadow information to the size of the underwater target.

FIG. 1 shows a cross-sectional view of the body of water 14 to illustrate features of the present invention during operation of the sonar imaging system 18. With additional reference to FIG. 12, the sonar imaging system 18 transmits the acoustic wave beam 47 from the side scan elements 26 and the acoustic wave beam 53 from downward scan elements 28. The receivers 74, 80, 86 begin listening for sonar returns through the transducer 20. The acoustic wave beams 47, 53 propagate to the bottom surface 16 and reflects a sonar return. The transducer 20 communicates the received sonar return to the receivers 74, 80, 86. A prior cycle had determined the depth, and in the illustrated embodiment, the depth is displayed on the display 62 as well as provided to a controller for evaluating the duration. Using the prior determined depth, a controller determines an approximate travel time for the sound energy signal 47, 53 to reach the bottom 16 and return. At a predetermined proportion of the travel time, the return sonar reaches a point near the transducer. The return sonar from the bottom 16 reflection carries details about the bottom 16. The controller directs the switch to change the receiving mode from transmit mode to receive mode. The receivers 74, 80, 86 then use the acoustic elements for the return sonar. The sonar imaging system 18 continues receiving in the narrow acoustic wave beam mode, until the start of the next T/R cycle. The received sonar returns are processed by the controller for display of representative symbols on the display 62. The T/R cycle then repeats with the newly determined depth from the prior cycle.

The sonar images from the down beam and side scan elements are then displayed on the display 62. These images may be shown in grey-scale or in color. The location of the watercraft 10 is also shown in the image. If the user chooses to only display the down beam sonar information, historic information is typically shown to the left of the location of the watercraft. As such, the display 62 shows images to the bottom of the watercraft 10 that are even with and behind the watercraft 10 when the watercraft 10 is traveling forward. The user may also display only the side scan sonar images, only those from one side scan element, or images from both sides and the bottom. The display 62 may also be configured (or configurable) to indicate information such as depth, and speed of the watercraft 10, range, etc.

In a highly preferred embodiment, a GPS receiver 92 is also included to provide the microprocessor 64 location information. This information may be used to provide charting and other navigational functions. To provide even more accurate images, the system of the present invention provides the offset necessary to account for the X and Y distance between the side imaging transducer and the GPS antenna. In one embodiment a cursor mode allows a user to move a cursor on the display 62 over a target of interest on the screen image and set a waypoint for the location of the structure. The GPS history may be used to determine the distance back and the sonar may be used to determine the distance to the side. The GPS speed is used in one embodiment to provide the screen scroll rate to provide more accurate front to back target dimensions. Without GPS or a speed sensor a fast scroll rate and a slow boat speed will elongate targets and a slow scroll rate and a fast boat speed will shorten targets. The corners of screen captures can be marked so that large area composite mosaic images can be generated in the unit 22 or post processed later. Preferably, one view that shows both side imaging and navigation information is provided. This makes it easier to follow tracks and provide efficient area coverage.

Referring to FIGS. 13-18, exemplary sonar images 92 reproduced from a display 62 are shown in grey-scale. Alternatively, the display 62 may display color sonar images. The location of the watercraft 10 is shown as "0" in the images 92. Historic information is shown to the left of "0". As such, the display 62 shows images 92 to the bottom or side of the watercraft 10 that are even and behind the watercraft 10. A range 105 to the side of the watercraft 10 is also provided. A dark area 106 along the top of the display 62 shows the water column above the bottom 16. The portion 93 of the image 92 below the water column dark area 106 shows returns from the bottom 16. As shown by the returns in the sonar images 92, the body of water 14 includes the bottom 16 and underwater articles such as trees 94, logs 96, a sunken barge 98, and a school of fish 100. Shadows 102 from the underwater articles indicate the general distance or displacement of the underwater article (e.g., distance it extends from the bottom 1). Dark areas 104 typically indicate drop offs, holes, and the like. The display 62 may also be configured (or configurable) to indicate information such as depth 108, and speed 110 of the watercraft 10.

Figure 19:
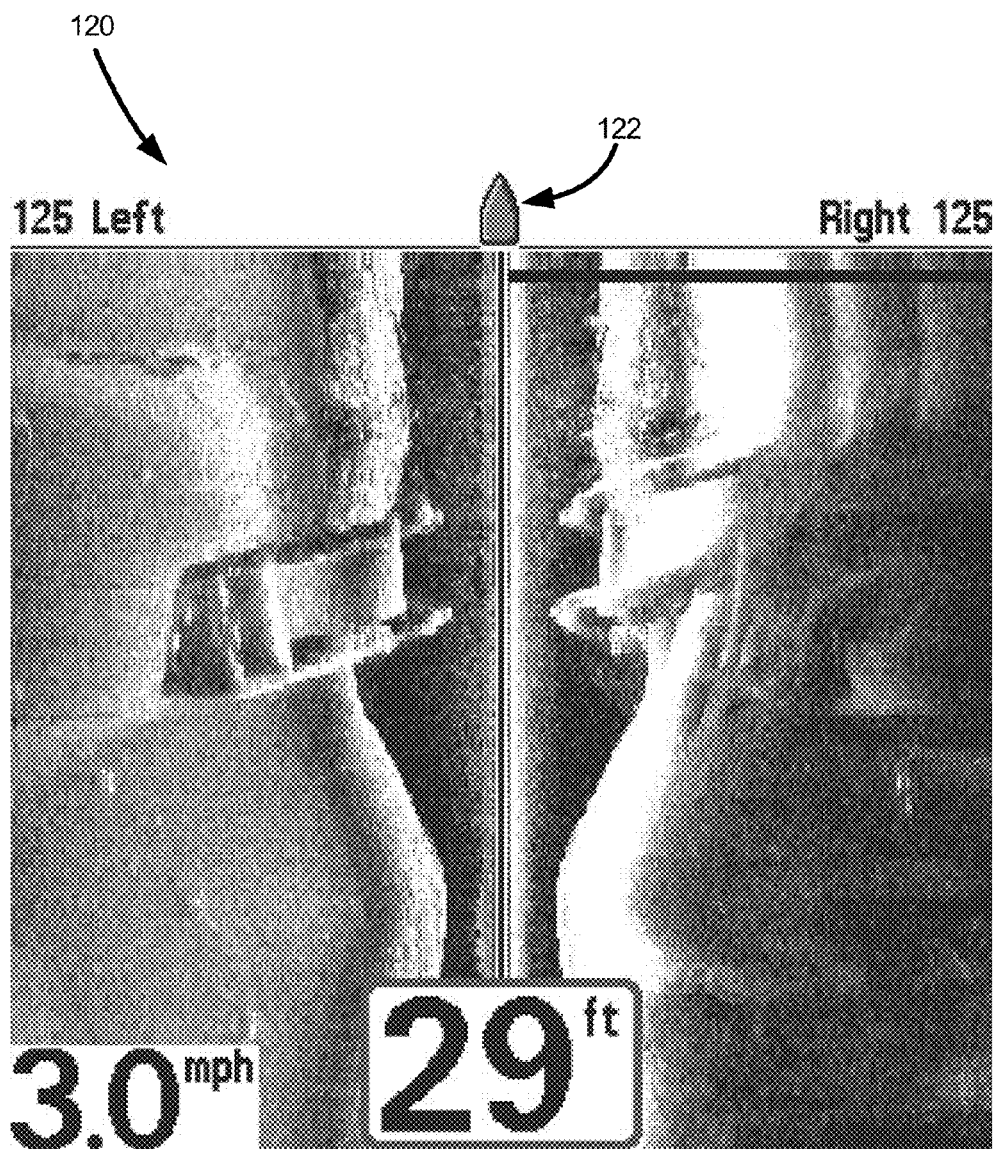
FIG. 19 shows a display screen showing an underwater environment using sonar images from both side scan elements and sonar returns from a downward sonar element.

According to a preferred embodiment shown in FIG. 19, the display 62 is configurable to provide an image 120 that shows the underwater environment using both side scan elements (views) 26 and the downward scan element 28. An icon 122 (in the form of a schematic watercraft) indicates the position and orientation and direction of travel of the watercraft 10.

It is important to note that the terms are intended to be broad terms and not terms of limitation. These components may be used with any of a variety of products or arrangements and are not intended to be limited to use with fish finding applications. For example, mounting to a watercraft is not intended to be limiting to devices that are directly attached to the watercraft, but would include devices attached to motors (such as trolling motors) attached to the watercraft, and the like.

It is also important to note that the construction and arrangement of the elements of the sonar imaging system for mounting to a watercraft as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the transducer preferably provides dual frequency, single element side beams in the form of two opposed vertical beams optimized for range and depth and front to back beam width selected based on image resolution, fish finding and transducer length.

Elements shown as integrally formed may be constructed of multiple parts or elements show as multiple parts may be integrally formed, the operation of the interfaces may be modified or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present invention as defined in the appended claims.

The order or sequence of any process or method steps may be varied or re-sequenced according to alternative embodiments. In the claims, any means-plus function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system mounted to a boat to provide underwater sonar images, the system comprising:
   a left side scan sonar transducer for transmitting left side scan sonar pulses directed downward and laterally outward to a left side of the boat, the left side scan sonar pulses forming a beam having a narrow horizontal width in a direction of travel of the boat and a wide vertical width in a plane perpendicular to the direction of boat travel, and for receiving left side scan sonar return signals;
   a right side scan sonar transducer for transmitting right side scan sonar pulses directed downwardly and laterally outward to a right side of the boat, the right side scan sonar pulses forming a beam having a narrow horizontal width in the direction of travel of the boat and a wide vertical width in the plane perpendicular to the direction of boat travel, and for receiving right side scan sonar return signals;

signal processing circuitry for processing the left and right side scan sonar return signals to produce side scan image data;

a display; and a digital processor for providing signals to the display based upon the side scan image data to produce a display image on the display showing a grey-scale or color underwater image that provides details of underwater articles and bottom and contains shadowing comprising a) at least one of a left side underwater image and a right side underwater image, b) a boat location relative to the underwater image, and c) an indication of distance from the boat, wherein the indication is associated with the underwater image.

2. The system of claim 1, wherein in response to a zoom input, the digital processor causes the display to produce a zoom display image of a user selected portion of the underwater image.

3. The system of claim 1, wherein the underwater image comprises both the left and right side underwater images.

4. The system of claim 3, wherein a water column between the boat and bottom is shown in the display image between the left side underwater image and the right side underwater image.

5. The system of claim 1, and further comprising:
a down beam sonar transducer for producing sonar pulses, and for receiving down beam sonar return signals.

6. The system of claim 5, wherein the digital processor provides signals to the display to cause the display image to include a numerical representation of current depth of a water column between the boat and the bottom based upon the down beam sonar return signals.

7. The system of claim 5, wherein the signal processing circuitry produces down beam sonar data based upon the down beam sonar return signals, and wherein the digital processor provides signals to the display based upon the down beam sonar data.

8. The system of claim 7, wherein the display image includes a portion based upon the down beam sonar data.

9. The system of claim 1, wherein the boat location is shown in the display image by an icon.

10. The system of claim 9, wherein the icon indicates position and direction of travel of the boat.

11. The system of claim 1, wherein the indication of lateral distance indicates lateral distance from the boat to an outer edge of the underwater image.

12. The system of claim 1, wherein each of the left and right side scan sonar transducers is operable at a first frequency to provide sonar return signals from substantially an entire water column between each transducer and bottom, and a second frequency to provide sonar return signals for displaying a higher resolution image of a portion of the water column on the display.

13. A system for providing navigational information, water depth information, and underwater sonar images, the system comprising:
a GPS receiver for providing GPS position data;
a sonar transducer assembly mounted to a boat, the sonar transducer assembly including a left side scan sonar transducer, a right side scan sonar transducer, and a down beam sonar transducer;
signal processing circuitry for processing sonar return signals from the left side scan sonar transducer, the right side scan sonar transducer, and the down beam sonar transducer;
a user interface including user inputs and a display; and
a digital processor for controlling the display based upon the processed sonar return signals and the GPS position data to display information in a plurality of modes selectable with the user inputs, wherein the plurality of modes include:
a mode in which the digital processor causes the display to display a grey-scale or color underwater image that provides details of underwater articles and bottom and contains shadowing based upon sonar return signals received by one of the left and right side scan sonar transducers;
a mode in which the digital processor causes the display to simultaneously show a grey-scale or color underwater image that provides details of underwater articles and bottom and contains shadowing based upon sonar return signals received by both of the left side scan sonar transducer and the right side scan sonar transducer;
a mode in which the digital processor causes the display to show information based upon the GPS position data; and
a mode in which the digital processor causes the display to simultaneously show a grey-scale or color underwater image that provides details of underwater articles and bottom and contains shadowing based upon sonar return signals received by one or both of the left side scan transducer and the right side scan transducer, and information based upon GPS position data;
wherein the digital processor causes the display to show an indication of distance from the boat, wherein the indication is associated with the grey-scale or color underwater image.

14. The system of claim 13, wherein the digital processor causes the display to show a position of the boat relative to the grey-scale or color underwater image.

15. The system of claim 13, wherein the digital processor causes the display to enlarge a user selected portion of the grey-scale or color underwater image in response to a user input.

16. A method of providing underwater sonar images, the method comprising:
transmitting left and right side scan sonar pulses with left and right side scan sonar transducers, respectively;
receiving left and right side scan sonar return signals with the left and right side scan sonar transducers, respectively;
generating side scan image data from the left and right side scan sonar return signals;
displaying a grey-scale or color underwater image that provides details of underwater articles and bottom and contains shadowing based upon the side scan image data; and
displaying a scale associated with the grey-scale or color underwater image indicating lateral distance from a boat,
wherein the left and right side scan sonar transducers are mounted to the boat, and wherein the left side scan sonar pulses are directed downward and laterally outward to a left side of the boat, the left side scan sonar pulses having a narrow horizontal width in a direction of travel of the boat and a wide vertical width in a plane perpendicular to the direction of boat travel, and wherein the right side scan sonar pulses are directed downward and laterally outward to a right side of the boat, the right side scan sonar pulses having a narrow horizontal width in the direction of travel of the boat and a wide vertical width in the plane perpendicular to the direction of boat travel.

17. The method of claim 16, wherein a position of the boat relative to the underwater image is represented by an icon on the display.

18. The method of claim 16, and further comprising:
transmitting down beam sonar pulses with a down beam sonar transducer mounted to the boat;
receiving down beam sonar return signals with the down beam sonar transducer; and
generating and displaying an indication of depth of a water column below the boat based upon down beam sonar return signals.

\* \* \* \* \*

UNITED STATES PATENT AND TRADEMARK OFFICE
CERTIFICATE OF CORRECTION

PATENT NO.         : 7,710,825 C1  
APPLICATION NO.    : 90/009958  
DATED              : May 4, 2010  
INVENTOR(S)        : David A. Betts et al.

Page 1 of 1

It is certified that error appears in the above-identified patent and that said Letters Patent is hereby corrected as shown below:

On the title page of the Ex Parte Reexamination Certificate at (73) Assignee, replace "PNC Bank, National Association, Pittsburgh, PA (US)" with -- Johnson Outdoors Inc., Racine, WI (US) --.

Signed and Sealed this  
Eleventh Day of June, 2013

Teresa Stanek Rea  
*Acting Director of the United States Patent and Trademark Office*

US007710825C1

(12) EX PARTE REEXAMINATION CERTIFICATE (9636th)
United States Patent
Betts et al.

(10) Number: US 7,710,825 C1
(45) Certificate Issued: May 8, 2013

(54) SIDE SCAN SONAR IMAGING SYSTEM WITH BOAT POSITION ON DISPLAY

(75) Inventors: David A. Betts, Eufaula, AL (US); Robert W. Derrow, Eufaula, AL (US); David J. Howells, Atlanta, GA (US)

(73) Assignee: PNC Bank, National Association, Pittsburgh, PA (US)

Reexamination Request:
No. 90/009,958, Oct. 17, 2011

Reexamination Certificate for:
Patent No.: 7,710,825
Issued: May 4, 2010
Appl. No.: 12/319,594
Filed: Jan. 9, 2009

Related U.S. Application Data

(63) Continuation of application No. 11/195,107, filed on Aug. 2, 2005, now Pat. No. 7,652,952.

(60) Provisional application No. 60/598,326, filed on Aug. 2, 2004.

(51) Int. Cl.
*G01S 15/89* (2006.01)
*G01S 7/52* (2006.01)

(52) U.S. Cl.
USPC ............................. 367/107; 367/88; 367/111

(58) Field of Classification Search
None
See application file for complete search history.

(56) References Cited

To view the complete listing of prior art documents cited during the proceeding for Reexamination Control Number 90/009,958, please refer to the USPTO's public Patent Application Information Retrieval (PAIR) system under the Display References tab.

*Primary Examiner* — Ryan Stiglic

(57) ABSTRACT

A system for use with a boat to provide underwater sonar images includes a left side scan sonar transducer for transmitting left side scan sonar pulses and for receiving left side scan sonar return signals and a right side scan sonar transducer for transmitting right side scan sonar pulses and for receiving right side scan sonar return signals. The system further includes signal processing circuitry for processing the left and right side scan sonar return signals to produce side scan image data and a digital processor for providing signals to a display based upon the side scan image data to produce a display image on the display showing boat location, a water column between the boat and bottom, and an underwater image comprising at least one of a left side underwater image and a right side underwater image.

At the time of issuance and publication of this certificate, the patent remains subject to pending reissue application number 13/359,417 filed Jan. 26, 2012. The claim content of the patent may be subsequently revised if a reissue patent is issued from the reissue application.

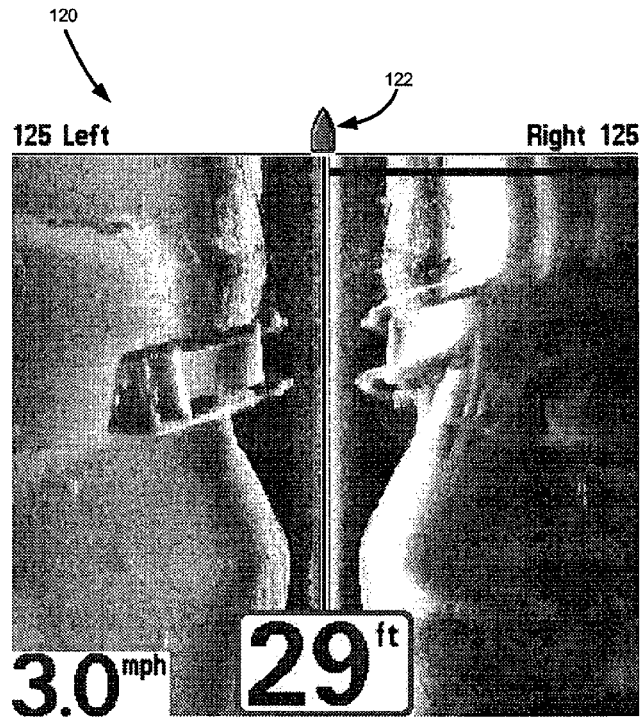

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 8, lines 9-26:

The [return] sonar *return* signal from the bottom reflection carries details about the bottom 16. The [return] sonar *return* signal from the side reflection carries details about the sides and bottom 16 to the side of the watercraft 10. The sonar return [data is] *signals are* communicated or sent to be processed by the transducer 20 to the electronic control head unit 22 for display of images or symbols representative of the received return echoes of the acoustic wave beams. The transmission of an acoustic pulse and the reception of reflected echoes is a transmit/receive cycle, which is referred to herein as a T/R cycle. The wavefront of the acoustic pulse travels from the transducer 20, to the bottom 16 of the body of water 14, and reflects back to the transducer which receives the reflected echoes of the acoustic wave beam. The duration of the T/R cycle depends on the depth of the water. Typically, the T/R cycles of transmission and reception are two to four times per second for deep water and more frequently, such as one-thirtieth of a second, for shallower waters.

Column 8, line 44, and column 9, line 26:

The microprocessor 64 is coupled to the user interface and is configured to process the *sonar return* data from the co-processor 66 (e.g., control the displayed information, format the information for display, run the operational algorithms, and the like). The microprocessor 64 can be a microcontroller, application-specific integrated circuit (ASIC) or other digital and/or analog circuitry configured to perform various input/output, control, analysis, and other functions described herein. In one embodiment, the microprocessor 64 includes a memory (e.g., non-volatile memory) configurable with software to perform the functions disclosed herein. The microprocessor 64 of the electronic control head unit 22 implements programmed algorithms (e.g., differential amplitude filtering (eliminate engine spark noise), time variable gain optimization—for best image, fish finding algorithms, anti-ringing pulse on transmit for better resolution, and use down beam depth to correct slant angle range information). According to a preferred embodiment, a software filter algorithm is provided to filter certain noise common to operation of watercraft (and noise caused by sparkplug in particular).

During operation of the sonar imaging system 18 in a particularly preferred embodiment, amplitude readings are taken approximately every 0.75 inches, such that 100 feet of depth has 1600 readings. The 0.75 inch amplitude readings from the last transmit/receive cycle (T/R cycle) are saved into computer memory. For each of these 0.75 inch amplitude readings, present and previous amplitude readings the software conducts the following test: Is "present reading"-"previous reading">x. If Yes, then substitute "previous reading" for "present reading". If no, use the present reading. The microprocessor 64 also filters the [signals] *sonar return data*, sorts sonar target [returns] *return data* from *that of* the bottom and fish, calculates display range parameters and then feeds the processed [signals] *data* to the LCD display screen. The display 62 is preferably a graphic display, for example, but not limited on the pixel order. Other displays such as LED, flasher, A-scope and digital segment may alternatively be used. The electronic control head unit 22 may be powered by batteries (e.g., its own dedicated batteries, marine battery, etc.).

The co-processor 66 is coupled to the microprocessor 64 and is configured to collect, process, and pass *sonar return* data to the microprocessor 64 (e.g. generates the transmission frequencies, converts the analog [data] *sonar return signals* to digital *sonar return data* with *an* A/D converter and sends to the microprocessor 64). The co-processor 66 can be a microcontroller, application-specific integrated circuit (ASIC) or other digital and/or analog circuitry configured to perform the functions disclosed herein. In one embodiment, the co-processor 66 includes a memory (e.g., non-volatile memory) configurable with software to perform the functions disclosed herein.

AS A RESULT OF REEXAMINATION, IT HAS BEEN DETERMINED THAT:

Claims 1, 11, 13 and 16 are determined to be patentable as amended.

Claims 2-10, 12, 14, 15, 17 and 18, dependent on an amended claim, are determined to be patentable.

New claims 19-30 are added and determined to be patentable.

1. A system [mounted to a boat] to provide underwater sonar images, the system comprising:
   a *boat-mounted transducer assembly including a housing;*
   a left side scan sonar transducer *positioned within the housing* for transmitting left side scan sonar pulses directed downward and laterally outward to a left side of the boat, the left side scan sonar pulses forming a beam having a narrow horizontal width in a direction of travel of the boat and a wide vertical width in a plane perpendicular to the direction of boat travel, and for receiving left side scan sonar return signals;
   a right side scan sonar transducer *positioned within the housing* for transmitting right side scan sonar pulses directed downwardly and laterally outward to a right side of the boat, the right side scan sonar pulses forming a beam having a narrow horizontal width in the direction of travel of the boat and a wide vertical width in the plane perpendicular to the direction of boat travel, and for receiving right side scan sonar return signals, *wherein the length of the housing is substantially co-extensive with the length of the left and right side scan sonar transducers therein*;
   signal processing circuitry for processing the left and right side scan sonar return signals to produce side scan image data;
   a display; and
   a digital processor for providing signals to the display based upon the side scan image data to produce a display image on the display showing a grey-scale or color underwater image that provides details of underwater articles and bottom and contains [shadowing] *shadows* comprising a) at least one of a left side underwater image and a right side underwater image, b) a boat location relative to the underwater image, and c) an indication of distance from the boat, wherein the indication is associated with the underwater image.

11. The system of claim 1, wherein the indication of [lateral] distance indicates lateral distance from the boat to an outer edge of the underwater image.

13. A system for providing navigational information, water depth information, and underwater sonar images, the system comprising:
  a GPS receiver for providing GPS position data;
  a sonar transducer assembly mounted to a boat, the sonar transducer assembly including *a housing, and* a left side scan sonar transducer, a right side scan sonar transducer, and a down beam sonar transducer *positioned within the housing, wherein the length of the housing is substantially co-extensive with the length of the left and right side scan sonar transducers therein*;
  signal processing circuitry for processing sonar return signals from the left side scan sonar transducer, the right side scan sonar transducer, and the down beam sonar transducer;
  a user interface including user inputs and a display; and
  a digital processor for controlling the display based upon the processed sonar return signals and the GPS position data to display information in a plurality of modes selectable with the user inputs, wherein the plurality of modes include:
    a mode in which the digital processor causes the display to display a grey-scale or color underwater image that provides details of underwater articles and bottom and contains [shadowing] *shadows* based upon sonar return signals received by one of the left and right side scan sonar transducers;
    a mode in which the digital processor causes the display to simultaneously show a grey-scale or color underwater image that provides details of underwater articles and bottom and contains [shadowing] *shadows* based upon sonar return signals received by both of the left side scan sonar transducer and the right side scan sonar transducer;
    a mode in which the digital processor causes the display to show information based upon the GPS position data; and
    a mode in which the digital processor causes the display to simultaneously show a grey-scale or color underwater image that provides details of underwater articles and bottom and contains [shadowing] *shadows* based upon sonar return signals received by one or both of the left side scan *sonar* transducer and the right side scan *sonar* transducer, and information based upon GPS position data;
    wherein the digital processor causes the display to show an indication of distance from the boat, wherein the indication is associated with the grey-scale or color underwater image.

16. A method of providing underwater sonar images, the method comprising:
  transmitting left and right side scan sonar pulses with left and right side scan sonar transducers, respectively;
  receiving left and right side scan sonar return signals with the left and right side scan sonar transducers, respectively;
  generating side scan image data from the left and right side scan sonar return signals;
  displaying a grey-scale or color underwater image that provides details of underwater articles and bottom and contains [shadowing] *shadows* based upon the side scan image data; and
  displaying a scale associated with the grey-scale or color underwater image indicating lateral distance from a boat,
  wherein the left and right side scan sonar transducers are *positioned within a housing of a transducer assembly mounted to the boat, wherein the length of the housing is substantially co-extensive with the length of the left and right side scan sonar transducers therein,* and wherein the left side scan sonar pulses are directed downward and laterally outward to a left side of the boat, the left side scan sonar pulses having a narrow horizontal width in a direction of travel of the boat and a wide vertical width in a plane perpendicular to the direction of boat travel, and wherein the right side scan sonar pulses are directed downward and laterally outward to a right side of the boat, the right side scan sonar pulses having a narrow horizontal width in the direction of travel of the boat and a wide vertical width in the plane perpendicular to the direction of boat travel.

*19. The system of claim 1, wherein the left and right side scan sonar transducers are rectangular in shape, each having a total length of about three inches to about seven inches and a total width of about 0.125 inches to about 0.5 inches.*

*20. The system of claim 1, wherein the housing does not include any receiving or transmitting circuitry.*

*21. The system of claim 1, and further comprising:*
  *receiving and transmitting circuitry; and*
  *an electronic module operatively coupled to the left and right side scan sonar transducers, wherein the electronic module contains the receiving and transmitting circuitry.*

*22. The system of claim 21, wherein the electronic module further contains the signal processing circuitry.*

*23. The system of claim 22, wherein the electronic module further contains the digital processor.*

*24. The system of claim 21, and further comprising:*
  *a cable having a first end and a second end, the first end being operatively coupled to the left and right side scan sonar transducers, and the second end being operatively coupled to the electronic module,*
  *wherein the left and right side scan sonar return signals are sent over the cable to the receiving circuitry without amplification.*

*25. The system of claim 21, and further comprising:*
  *a cable having a first end and a second end, the first end being operatively coupled to the left and right side scan sonar transducers, and the second end being operatively coupled to the electronic module,*
  *wherein signals for creating the left and right side scan sonar pulses are sent over the cable from the transmitting circuitry to the left and right side scan sonar transducers.*

*26. The system of claim 1, wherein the left and right side scan sonar transducers are positioned within the housing at a depression angle of between about 20 degrees and about 40 degrees.*

*27. The system of claim 28, wherein the left and right side scan sonar transducers are positioned within the housing at a depression angle of about 30 degrees.*

28. The system of claim 1, wherein the housing has no openings on its surface aligned with the left and right side scan sonar transducers.

29. A system to provide underwater sonar images, the system comprising:
- a left side scan sonar transducer for transmitting left side scan sonar pulses directed downward and laterally outward to a left side of the boat, the left side scan sonar pulses forming a beam having a narrow horizontal width in a direction of travel of the boat and a wide vertical width in a plane perpendicular to the direction of boat travel, and for receiving left side scan sonar return signals;
- a right side scan sonar transducer for transmitting right side scan sonar pulses directed downwardly and laterally outward to a right side of the boat, the right side scan sonar pulses forming a beam having a narrow horizontal width in the direction of travel of the boat and a wide vertical width in the plane perpendicular to the direction of boat travel, and for receiving right side scan sonar return signals;
- wherein the left and right side scan sonar transducers are positioned within a boat-mounted housing at a depression angle of between about 20 degrees and about 40 degrees, and wherein the left and right side scan sonar transducers are mounted in respective cradles so as to provide the depression angle;
- signal processing circuitry for processing the left and right side scan sonar return signals to produce side scan image data;
- a display; and
- a digital processor for providing signals to the display based upon the side scan image data to produce a display image on the display showing a grey-scale or color underwater image that provides details of underwater articles and bottom and contains shadows comprising a) at least one of a left side underwater image and a right side underwater image, b) a boat location relative to the underwater image, and c) an indication of distance from the boat, wherein the indication is associated with the underwater image.

30. The system of claim 29, wherein each cradle is comprised of one or more projections each having a v-shaped recess and the depression angle is determined by the angle of the v-shaped recess.

* * * * *